US010255329B1

(12) United States Patent
Zadeh et al.

(10) Patent No.: US 10,255,329 B1
(45) Date of Patent: Apr. 9, 2019

(54) SYSTEM INFORMATION MANAGEMENT

(71) Applicant: VENTOVATE, LLC, Clarence Center, NY (US)

(72) Inventors: Shawn Sherwin Zadeh, Williamsville, NY (US); Dariush Habibollah Zadeh, Williamsville, NY (US); Shohreh Moini, Williamsville, NY (US)

(73) Assignee: Ventovate, LLC, Clarence Center, NY (US)

( * ) Notice: Subject to any disclaimer, the term of this patent is extended or adjusted under 35 U.S.C. 154(b) by 854 days.

(21) Appl. No.: 14/558,168

(22) Filed: Dec. 2, 2014

Related U.S. Application Data

(60) Provisional application No. 61/910,532, filed on Dec. 2, 2013.

(51) Int. Cl.
*G06F 17/27* (2006.01)
*G06F 17/30* (2006.01)

(52) U.S. Cl.
CPC ...... *G06F 17/3053* (2013.01); *G06F 17/2705* (2013.01); *G06F 17/30106* (2013.01); *G06F 17/30289* (2013.01); *G06F 17/30861* (2013.01)

(58) Field of Classification Search
CPC ........... G06F 17/3084; G06F 17/30867; G06F 17/30873
USPC ......................................... 707/248
See application file for complete search history.

(56) References Cited

U.S. PATENT DOCUMENTS

| | | | |
|---|---|---|---|
| 6,279,014 B1 | 8/2001 | Schilit et al. | |
| 6,285,999 B1 | 9/2001 | Page | |
| 6,750,859 B2 | 6/2004 | Sowizral et al. | |
| 7,051,009 B2 | 5/2006 | Suermondt et al. | |
| 7,392,232 B1 | 6/2008 | Wizdo et al. | |
| 7,844,557 B2 | 11/2010 | Acharya et al. | |
| 7,958,073 B2 | 6/2011 | Griffith et al. | |
| 2002/0049692 A1 | 4/2002 | Venkatram | |
| 2003/0177136 A1* | 9/2003 | Alpert | G06N 5/02 |
| 2006/0156353 A1* | 7/2006 | Dorner | H04N 7/163 |
| | | | 725/86 |
| 2006/0184481 A1 | 8/2006 | Zhang et al. | |

(Continued)

OTHER PUBLICATIONS

"Adversarial information retrieval". Wikipedia. Wikimedia Foundation, Inc. Web. May 30, 2013 <https://web.archive.org/web/20130530201838/http://en.wikipedia.org/wiki/Adversarial_information_retrieval>.

(Continued)

*Primary Examiner* — Jean B Fleurantin
(74) *Attorney, Agent, or Firm* — Volpe and Koenig, P.C.

(57) ABSTRACT

Methods and devices for interacting with information using a computing device. A plurality of nodes in a database may be created and stored on a non-transitory computer readable medium and accessible by a processor. Each node may have at least one data element and be linked to at least one other of the plurality of nodes such that the link reflects a relationship between the data elements referenced by the linked nodes. A plurality of information areas may be displayed, each displaying information stored in one of the data elements and positioned relative to the plurality of information areas based on the relationship. The plurality of information areas may be positioned such that a final portion of information displayed in a first information area in a sequence is aligned with an initial portion of information displayed in a subsequent information area in the sequence.

22 Claims, 21 Drawing Sheets

(56) References Cited

U.S. PATENT DOCUMENTS

| | | | |
|---|---|---|---|
| 2014/0006959 A1* | 1/2014 | Huliyar et al. | 715/736 |
| 2015/0046484 A1* | 2/2015 | Yoo | 707/758 |
| 2015/0261492 A1* | 9/2015 | Kawasaki et al. | 345/2 |

OTHER PUBLICATIONS

"Binary Independence Model". Wikipedia. Wikimedia Foundation, Inc. Web. Jun. 9, 2013 <https://web.archive.org/web/20130609132350/http://en.wikipedia.org/wiki/Binary_Independence_Model>.

Caldwell, William, Al-Rubaee, Faiz, Lipkin, Leonard, Caldwell, Della, and Campese, Matthew. Developing a Concept Mapping Approach to Mathematics Achievement in Middle School. Concept Maps: Theory, Methodology, Technology. Proc. of the Second Int. Conference on Concept Mapping. San Jose, Costa Rica, 2006. 1-7. Web.

"Champion list". Wikipedia. Wikimedia Foundation, Inc. Web. Jul. 26, 2013 <https://web.archive.org/web/20130726103907/http://en.wikipedia.org/wiki/Champion_list>.

Erkan, Gunes and Dragomir Radev. LexRank: Graph-based Lexical Centrality as Salience in Text Sumarization. Journal of Artifical Intelligence Research. vol. 22. pp. 457-479. 2004.

"HITS Algorithm". Wikipedia. Wikimedia Foundation, Inc., Web. Nov. 6, 2013 <https://web.archive.org/web/20131106120446/http://en.wikipedia.org/wiki/HITS_algorithm>.

"Information Retrieval". Wikipedia. Wikimedia Foundation, Inc. Web. Dec. 1, 2013 <https://web.archive.org/web/20131201215724/http://en.wikipedia.org/wiki/Information_retrieval>.

"Jaccard index". Wikipedia. Wikimedia Foundation, Inc. Web. Aug. 25, 2013 <https://web.archive.org/web/20130825091030/http://en.wikipedia.org/wiki/Jaccard_index>.

"List of concept mapping and mind mapping software". Wikipedia. Wikimedia Foundation, Inc., Web. Sep. 6, 2013. <https://web.archive.org/web/20130906042131/http://en.wikipedia.org/wiki/List_of_concept_mapping_and_mind_mapping_software>.

Mihalcea, Rada and Paul Tarau. TextRank Bringing Order into Texts. (2004). <http://web.eecs.umich.edu/~mihalcea/papers/mihalcea.emnlp04.pdf>.

"N-gram". Wikipedia. Wikimedia Foundation, Inc. Web. Oct. 4, 2013. <https://web.archive.org/web/20131004174026/http://en.wikipedia.org/wiki/N-gram>.

"Naïve Bayes classifier". Wikipedia. Wikimedia Foundation, Inc. Web. Nov. 13, 2013. <https://web.archive.org/web/20131113163038/http://en.wikipedia.org/wiki/Naive_Bayes_classifier>.

Nesbit, John, and Adesope, Olusola. Learning with Concept and Knowledge Maps: A Meta-Analysis. Review of Educational Research, Fall 2006, vol. 76, No. 3. American Educational Research Association.

Novak, Joseph, and Canas, Alberto. The Theory Underlying Concept Maps and How to Construct Them, Technical Report IHMC CmapTools Jan. 2006, Florida Institute for Human and Machine Cognition, 2006, available at: http://cmap.ihmc.us/Publications/ResearchPapers/TheoryUnderlyingConceptMaps.pdf.

"Okapi BM25". Wikipedia. Wikimedia Foundation, Inc. Web. Dec. 1, 2013. <https://web.archive.org/web/20131201232408/http://en.wikipedia.org/wiki/Okapi_BM25>.

Ritchhart, Ron, Turner, Terri, and Hadar, Linor. Uncovering Students' Thinking About Thinking Using Concept Maps. Metacognition Learning. vol. 4. pp. 145-159. 2009. Print. USA.

Richardson, Ryan. Using Concept Maps as a Tool for Cross-Language Relevance Determination. Jun. 6, 2007. Virgina Polytechnic Institute and State University. Blacksburg, VA, USA. Web. <http://scholar.lib.vt.edu/theses/available/etd-07022007-1845251>.

"Tf-idf". Wikipedia. Wikimedia Foundation, Inc. Web. Dec. 1, 2013. <https://web.archive.org/web/20131201232405/http://en.wikipedia.org/wiki/Tf%E2%80%93idf>.

Youtube. "Stanford Seminar—Who Owns the Future". Web. Sep. 25, 2013. <http://www.youtube.com/watch?v=cCvf2DZzKX0>.

"Likert scale". Wikipedia. Wikimedia Foundation, Inc. Dec. 1, 2013. <https://web.archive.org/web/20131201160450/http://en.wikipedia.org/wiki/Likert_scale>.

\* cited by examiner

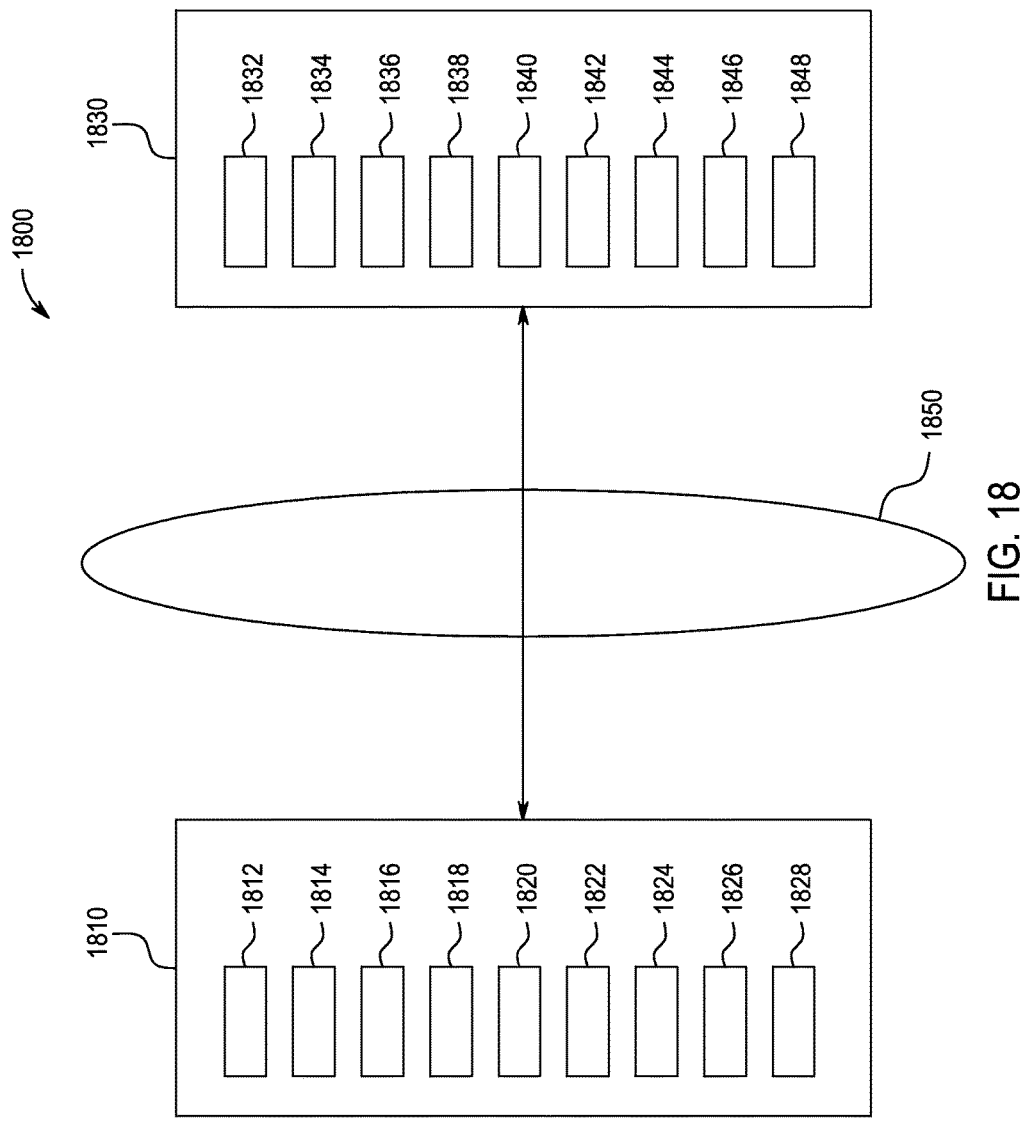

SYSTEM INFORMATION MANAGEMENT

CROSS REFERENCE TO RELATED APPLICATION

This application claims the benefit of U.S. provisional application No. 61/910,532, filed Dec. 2, 2013, the content of which is hereby incorporated by reference herein.

FIELD OF INVENTION

The invention relates to information management generally, and to structured information systems in particular.

BACKGROUND

In the field of information there has been a general focus on taking individual pieces of information and in some way grouping them. A subset of these information groupings could be defined as systems, which may feature parts that are interacting or interrelated. There has been a lack of focus however on trying to help individuals to understand such systems through the use of standardized, flexible, and individualized system creation, management, and communication. Furthermore, there has not been a focus on creating a system communication approach to compete with current communication methods both in scope and efficiency (e.g. documents, spreadsheets, websites, microblogging). There is however an ever increasing need for people to better understand systems to help secure jobs, civic governance and leadership, and communicate well in an age of increasingly abundant, yet fragmented, information.

Some literature relates generally to providing an automatic hierarchical scheme using temporal, graphics visualization, and entropic characteristics. These programs may allow for a computer-based system to help organize data, but do not attempt to intensively involve a human being in making grouping decisions or to help in education, training, and research.

Other literature relates generally to having certain people group and structure knowledge with computer-based systems. These knowledge structures may be either hierarchies or community matrices. To initiate and continue the creation of such knowledge groups, an expert or a knowledge community must be involved. As a result, such literature does not help to allow a mass of people to organize around subjects that matter individually to them, and then reach out to one another, as desired, to help further their individual analysis. In other words, such literature does not provide a non-expert form of system analysis or a self-assembling network of people.

U.S. Patent Application Publication No. 2002/0049692 relates generally to gaining knowledge by leveraging groups of people and documents. However, a standardized structure for the documents is not described. Furthermore, only a "cluster of knowledge" is described and there is no attempt to create individual elements of knowledge nor share information in terms of individual elements or collection of elements. Also, there is also no attempt to convert the "cluster of knowledge" format to any other format. Further, there is an emphasis on sharing knowledge within organizations, and the organizations developing "critical axes" for the knowledge sharing.

U.S. Patent Application Publication No. 2006/0184481 relates generally to defining relationships between authors and objects. There is an attempt to define people based on the information they provide, and how they share common information. However there is no attempt to create an environment in which systems are shared or created in a standardized format.

U.S. Pat. No. 6,279,014, relates generally to retaining the context of citations. There is no focus on system information.

Generally, there are similarities among the ways in which knowledge has been traditionally structured for describing a system. In research for example, an inductive or deductive approach is usually employed. Inductive approaches may begin with concrete data (e.g. observations) and move on to abstract notions (e.g. hypothesis), while deductive approaches proceed vice versa. An example of an inductive approach may be referred to as coding, which may include a progression of raw data, codes, categories, and concepts. Furthermore, beyond research, there have been traditions within project management and business theory. Business theory often connects objectives, strategies, tactics, and regular work activities, with variations including process control objectives, process control strategies, process control loops, and process control objects. Project management may use a concept called work breakdown structure to define a progression of project, control accounts, work packages, and activities. Business theory and project management deal with coordinating a number of people, however ultimately one user must be responsible for developing and understanding the overall plan. As a result, there is still a single-user focus.

In information retrieval, graphs are often used to describe nodes and connections between the nodes. From this mathematical concept, there have been numerous applications, some on the Internet. Algorithms like PageRank™ and Graph Search™ have been used to describe nodes as either websites or people respectively, with connections being characteristics or links respectively.

There are also a number of diagram forms in use by society in general. Tree diagrams offer a hierarchical scheme, by starting at a node and either branching downward or radially outward. Semantic networks work by defining nodes as concepts and relationships. Semantic network concepts and relationships may be free form, where every type of concept and relationship potentially exists within one semantic network. Argument maps may include a visual representation of an argument. Argument maps may have rules for development, and may include a main contention, supporting statements, and contradicting statements. Mental models may represent how someone understands an element of the real world. Nomological networks may represent concepts and their observable manifestations. Topic maps may include a form of concept map that is standardized. Such standardization rigidly uses topics, associations, and occurrences.

Mind Mapping and Concept Mapping software exists which relates to the aforementioned diagrams. These software products tend to use similar diagrams focusing on individual and group creation. They do not however use a standardized data organization format, are not minimalist in approach, and do not facilitate streamlined or efficient reading. Due to a lack of standardization, the searching and conversion capabilities of such software is limited.

In the United States pharmaceutical industry, there is a focus on confirming the quality of drugs through following approved procedures and quality assurance, often called validation. The validation of a computer system may involve checking what the computer algorithm does relative to an expected result taken from an approved design document. If there is an error, often an error protocol may be followed to complete the validation.

The expansion of burst communication (e.g. tweets, status updates, texting, microblogging, some forms of emails) has significantly impacted the way people communicate with one another. They stand in contrast with more traditional communication methods (e.g. essays, reports, poems) that often take more time to develop and communicate more complex ideas.

SUMMARY

Systems, methods and devices to present, analyze, execute, and/or mine system information are disclosed. The systems may include any grouping of related or interacting parts, with the parts possibly varying in scope or size. The part data may be in a variety of forms. For example, text, images, sounds, videos may be placed in an information area. The information area content may be stored in a variety of locations. For example, information areas may be stored in a memory cache, hard drive, file, database, or any combination thereof. Different parts of the same or different storage may be in different locations. For example, a web server may host a program and data for presenting, analyzing executing and/or data mining system information, and a client computer may execute the program with the data provided by the web server.

BRIEF DESCRIPTION OF THE DRAWINGS

The foregoing summary, as well as other objects, features, and advantages of this invention may be more completely understood by reference to the following detailed description when read together with the accompanying drawings in which:

FIG. 18 is a block diagram illustrating an example system which may be used in various embodiments.

Figure 1:
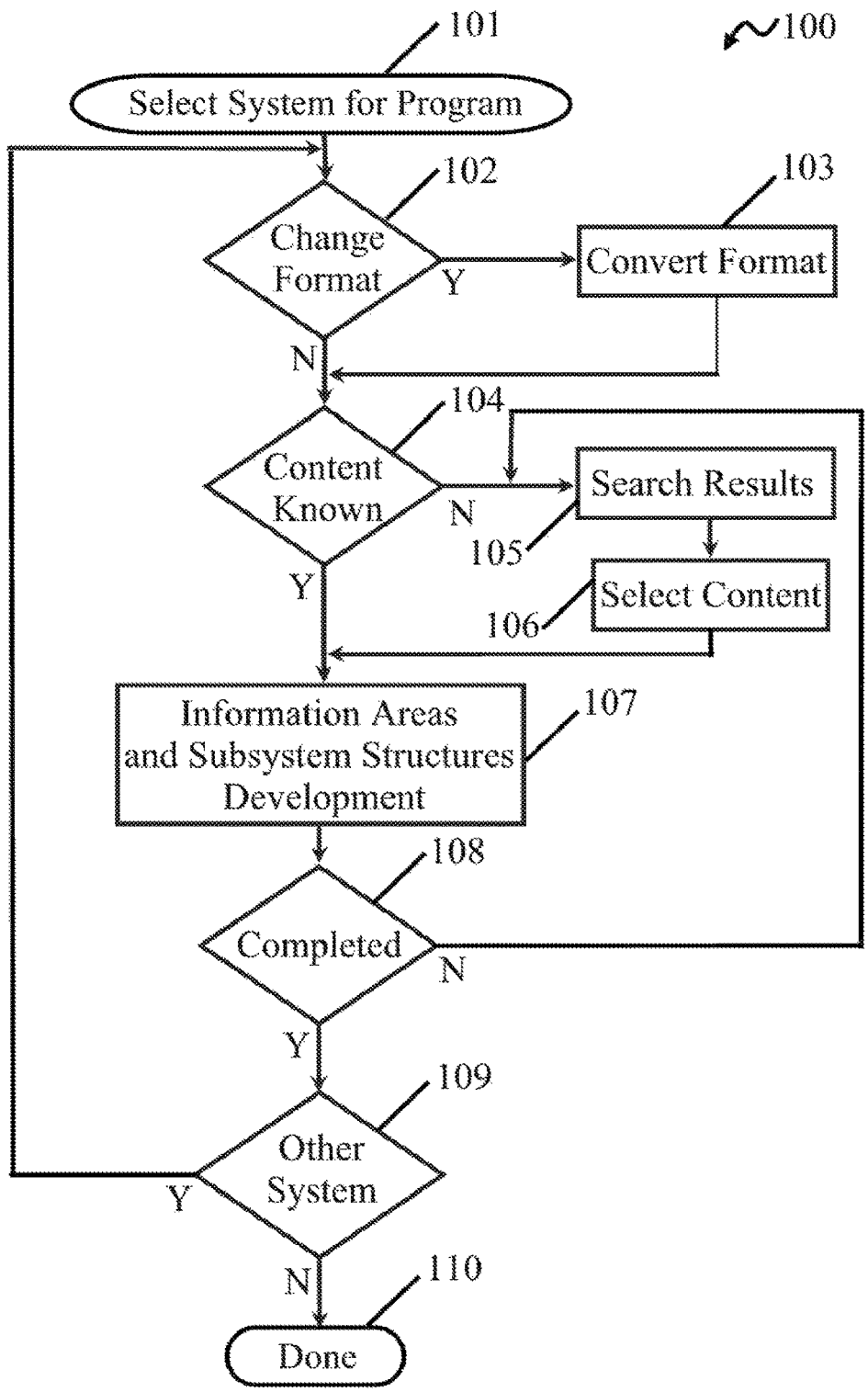
FIG. 1 is a flowchart illustrating an example algorithm.

While the invention is susceptible to various modifications and alternative forms, specific embodiments are shown by way of example in the drawings and will be described in detail. It should be understood, however, that the drawings and detailed descriptions are not intended to limit the invention to the particular forms disclosed, but on the contrary, the intention is to cover all modifications, equivalents, and alternatives falling within the spirit and scope of the present invention as defined by the appended claims. The section headings used herein are for organizational purposes only and are not meant to limit the description or claims.

DETAILED DESCRIPTION OF THE PREFERRED EMBODIMENTS

In an example implementation, a group of letters, numbers, symbols, shapes, sounds, colors, formatting or any combination thereof may be placed in an information area. A number of information areas may be used to contain information about a system. The information areas may be contained in a number of subsystem structures. These subsystem structure assignments may define how the information areas relate to one another.

If the description of the system is not completely known for a particular information area, the user or program may request the information to be filled from a database or collection of files containing other system descriptions via one or more queries. This search may be aided by what the user or program has entered into other information areas. After receiving the matching results for every query, the results may be complied and ranked. The end listing of results may show what possible information is appropriate for the information area, which would ultimately be determined by the user requesting the search. Furthermore, there may also be a command to view other information areas and subsystem structures contained within the same systems that were identified in the query, depending on what was shared by the original author.

Some embodiments of the information areas may be akin to cells. In some embodiments, such cells may be formed into a pseudo-table of n columns by m rows, where n and m may or may not be equal and may be greater than or equal to one. Each column or row may be defined as a subsystem structure called an order. For example, the first column may be order 1 and the last column may be order n. Depending on which are classified as orders; the others are classified as the subsystem structure subspaces. For example, the first row may refer to subspace 1 and the last row may refer to subspace m. In other words, subspaces and orders may be distinct for a given state, however the state may be changed dynamically based on selection criteria. In some embodiments, the progression of order 1 through order n may represent going from the most abstract concepts to the most grounded concepts, and the progression of subspace 1 through subspace n may represent a progression from the earliest to latest mental state of a user.

Some embodiments may allow a user to convert between various formats and the information area-subsystem structure format via an algorithm. Such conversion may be dependent on the user's selections, system attributes, past system attributes, and/or past conversion history among the user and other people.

Various embodiments may have the advantage of providing for preservation of information context through subsystem structures and automatic citations/cross-referencing for the author and other users; decrease of repetitive information and transition statements found in prose writing, allowing increased communication efficiency; gaining the advantages of burst and traditional communication simultaneously via subsystem structures and information areas; creating complex system information via a standardized yet flexible interface involving subsystem structures; finding unknown system information that the user is either aware of or not aware of by leveraging known system information of the user and system information of others; an alternative to hierarchies via ordered information and positioning effects that does not bias or elevate the importance of information or groupings; the creation of an effective, virtual mind made up of system information provided by all users; better translations between languages through the identification of information context and relationships; the use of system information with geographical information to further execution assistance; and a payment scheme that focuses on value delivered from the system information, presentation, and validity.

FIG. 1 is a flow chart illustrating an example algorithm 100 which includes system format conversion 103, system information searching 105, and system information development 107. System format conversion 103 and system information searching 105 algorithms may be executed on a server. System information development 107 may be executed on both a client computer and server computer. Algorithm 100 may be employed when a user or algorithm desires to interact with system information in the information area-subsystem structure format 101.

To determine whether system format conversion 103, system information searching 105, or system information development 107 should be executed, the user or algorithm using the algorithm 100 may determine what system content needs to be formatted differently 102, needs to be searched 103, is used 106, and/or is completed 108, including determining whether all system development is done 109. Afterwards, the user or algorithm may exit the program 110.

Figure 2A:
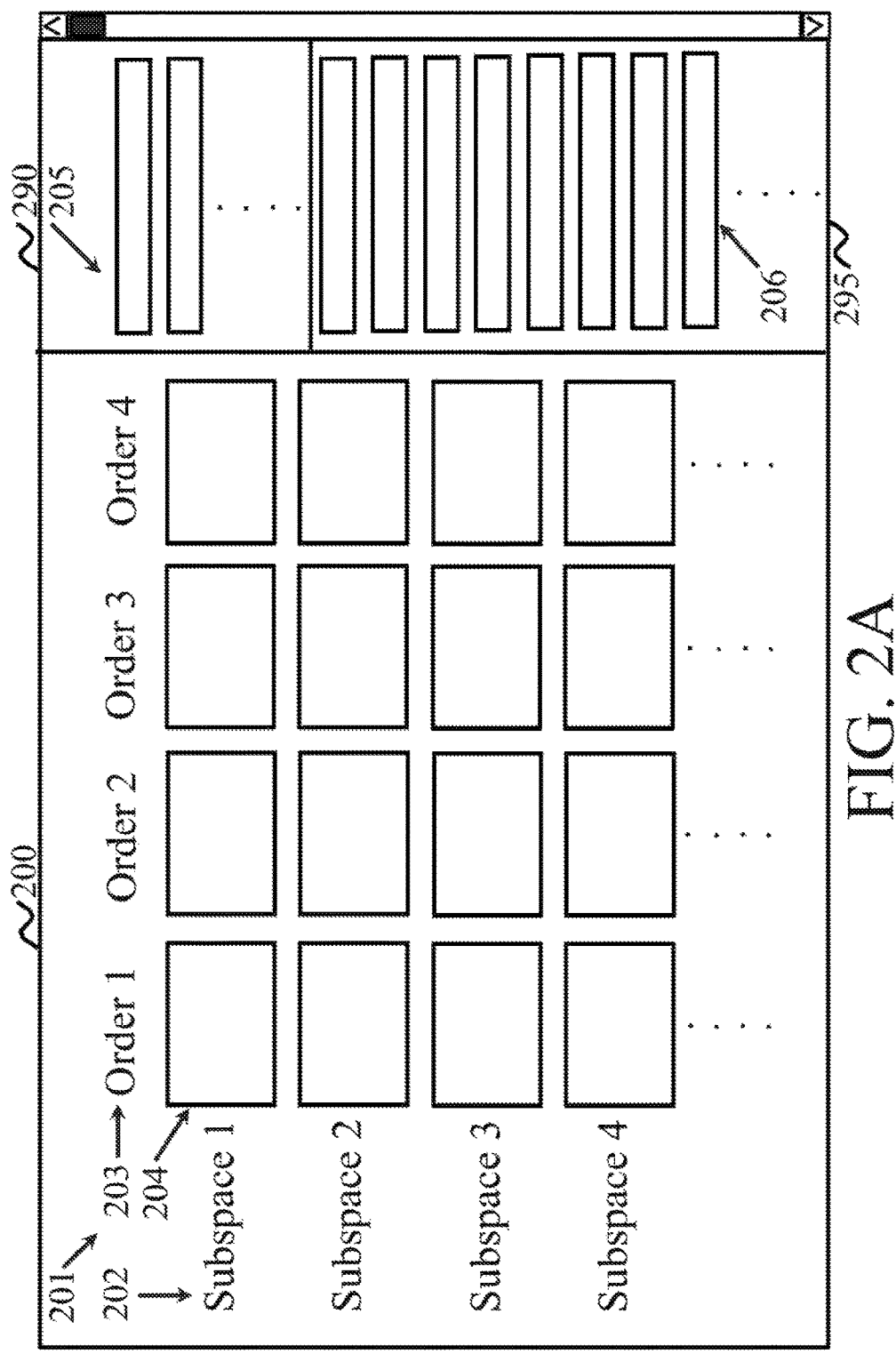
FIG. 2A is a diagram which illustrates an example computer interface for system creation and management shown without any system information present.

FIG. 2A is a diagram which illustrates an example computer interface 200 for system creation and management. A system description 201 is shown without any system information present. The illustration shows an initialized state of the computer interface before any system information is loaded. Rows 202 and columns 203 may be referred to as subsystem structures. At each intersection of rows 202 and columns 203 are information areas 204. The computer interface may be created using hypertext markup language (HTML). In implementations where HTML is used, information areas 204 may include TEXTAREA objects. The TEXTAREA objects may be placed in DIV sections. The number of TEXTAREA objects in each DIV may determine the number of columns, and the number of DIV sections may determine the number of rows. The TEXTAREA objects content may be stored as different database entities via a server-side program after validating and normalizing the data with another server-side program. Data transfer between JavaScript (i.e. the client-side program) and the server-side program may be done via Ajax functionality for automatic saving or a manual 'save' command via a standard HTML button input. It is noted that the interface may be implemented in a similar manner using other suitable programming and/or scripting languages. Various objects and functionality is described herein using terms specific to HTML, however it is understood that other corresponding objects, functions, and the like may be used in other implementations.

To allow access for various editing, selection, viewing, searching, and user account functions, a pane 290 may be provided, which may contain various topic icons 205. If a one of topic icons 205 is selected, a pane 295 may be changed to reflect associated detailed option and command icons 206. Pictures and/or text descriptions which may execute JavaScript or other algorithms upon clicking or selection may be used as the topic icons 205 to represent various topics. The JavaScript or other algorithms may create HTML or other objects via, for example, innerHTML commands, which may produce the detailed option and command icons 206. Both panes 290 and 295 and icons 205, 206 may have fixed CSS position settings to ensure they stay at the right-hand side (for example), or are contained in frames, which would may different HTML documents for each selection.

Figure 2B:
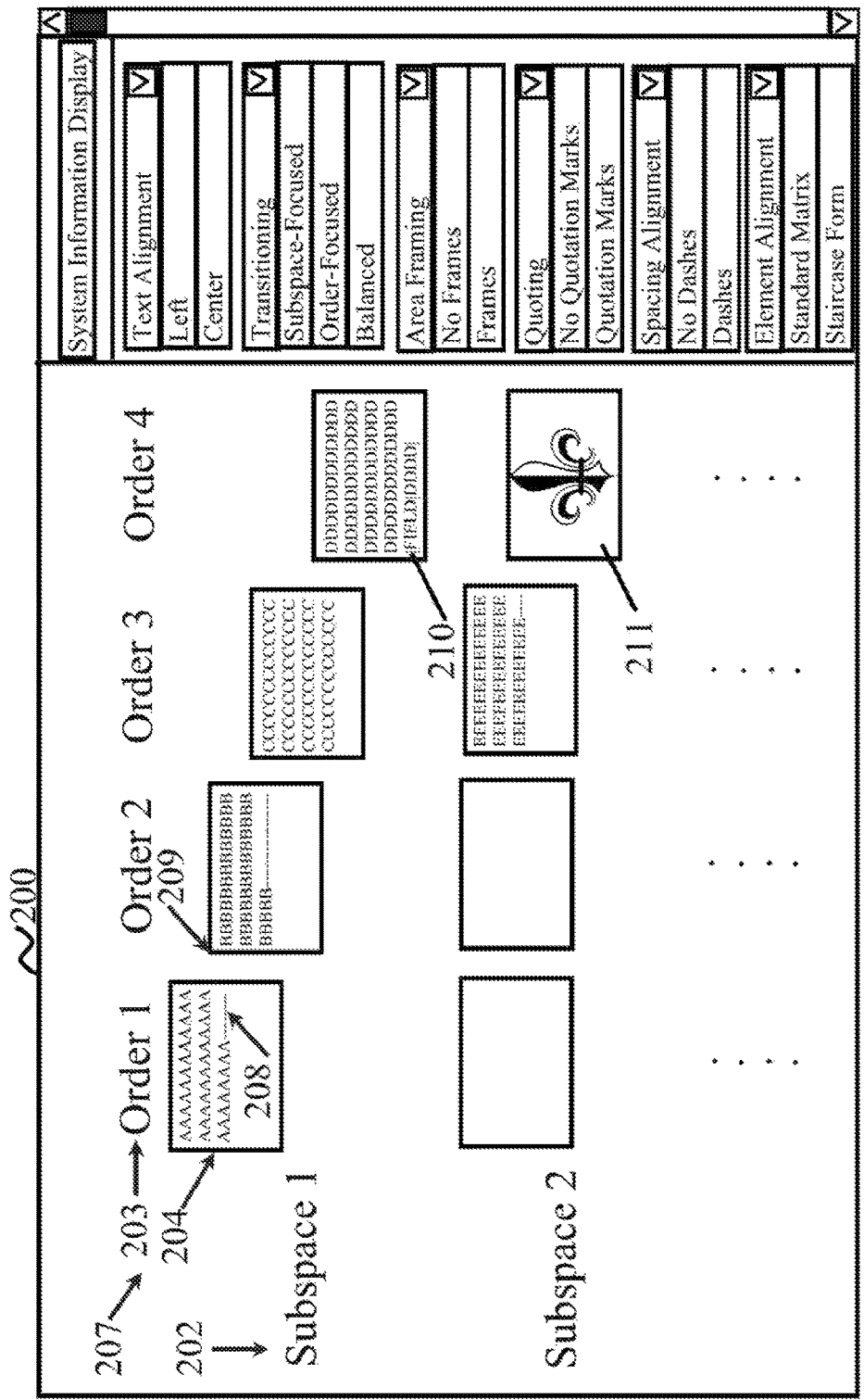
FIG. 2B is a diagram which illustrates an example computer interface for system creation and management with data loaded.

FIG. 2B is a diagram which illustrates example computer interface 200 after data 207 is loaded. As shown, information areas 204 are no longer aligned within rows 202, but rather are arranged in a vertical staircase format within rows 202. This arrangement may be achieved through JavaScript code that may be event-driven, for example, by pressing down on a mouse button or keyboard button. The code may collect the content in the TEXTAREA, find the number of pixels that each word takes up, take into account the spacing between words, find the number of pixels that a line of text takes to display, calculate the total lines of text (up to a limit, such as 5), and shift all subsequent objects down via CSS style relative positioning referencing the number of lines calculated, or another suitable technique. The positioning calculation may accumulate the number of lines for positioning to ensure the information areas do not overlap. Because the TEXTAREA objects do not change in height however, the last column lines of text may not need to be used for the calculation. For information areas 204 which contain non-text information, such as pictures or video previews, the non-text information may be assumed to take up the limit of equivalent lines of text, such as 5.

To implement the staircase formatting, spacing correction may be required between information areas 204. This may be necessary for example where an aligned left format is used for text within an information area 204. The spacing correction may be used so that excessive spaces or gaps do not cause confusion when a user is reading the information areas 204 in the subsystem structures (i.e. rows 202 and columns 203). Aligning the information areas 204 in this way may have the advantage of aiding in the information within related information areas 204 being perceived as connected to one another so that the subsystem structures are communicated properly. The spacing compensation may be achieved through the aforementioned JavaScript code for the staircase presentation. For example, the pixel length of one line of text within an information area 204 may be compared to the pixel length of the last line of text within the information area 204. This pixel length difference may be used to determine a number of dashes to added to the end of the last line, using the pixel length of one dash for example. Adding dashes in this way may assist in perceiving information contained in related information areas 204 as related information.

It may be desired to include template fields 210 within information areas 204 under various circumstances. Special characters (e.g. |, %, #) may be used to delimit a template field 210. Such special characters may be arranged to surround the generic field name, followed by the information (such as user information, for example) contained within the field. When the user visits a user web page, (such as the page illustrated in FIG. 5) JavaScript regular expressions functionality (or other suitable code) may be used to search for template fields 210. The output of such searching may show only the information contained in the field. In some implementations, if a user decides to share information areas 204 that contain template fields 210, only the generic field may be displayed to other users. This display may be completed by removing the user information field through server-side regular expression functionality before storing it in a specific row and column of a public database table.

In some implementations the use of different data formats 211 for information in the information areas 204 may be desired, such as non-text data. For example, sometimes only a picture or video may be stored in an information area 204, or data stored in an information area 204 may be of 2 or more formats. In order to present the information areas 204 in this case, the original TEXTAREA object may be removed or modified, or another similar action may be performed. If picture or video is used exclusively, an IMG object (or similar object) containing a picture preview of a larger picture or video may replace the TEXTAREA object. Such previews may be generated using an Ajax call (or similar call) to the server to retrieve the picture or video preview via server-side scripts after the user has uploaded the picture or video to that server. In cases where two or more data formats are used within an information area 204, such as text with picture or video for example, tabs may be added via JavaScript or another suitable code, which may utilize the previous functionality for replacing one HTML object (or other suitable object) for another. In this scenario when a tab or other designated input is clicked, the HTML object replacement code may execute. In one possible implementation, the object replacement code may switch an IMG DIV element for a TEXTAREA object. It is noted however that the other data may be stored in other database tables in a specific row and column, since it may not be desirable for text and video to share a specific database location.

In operation, user input may be received through a keyboard, mouse, or other suitable device. In the following example, single-key commands may be used to interact with interface 200 while an information area is selected. For example, pressing the left mouse button may select an information area; pressing the period button may cause the next information area to be selected, (which may be in the same or next subsystem structure, depending on if the end of the subsystem structure is not reached or is reached respectively); pressing the enter key may select an information area one subspace down in the same order; pressing the tab key may select the next information area in the same or different subspace, depending on whether the subspace end has or has not been reached respectively; and the arrow keys may allow a user to navigate within a TEXTAREA. Multi-key commands may also be used to interact with interface 200 while an information area is selected. For example, pressing the period and alt keys may select an information area in an opposite manner than the period key; pressing shift and enter keys may select an information area one subspace up in the same order; pressing shift and tab keys may select an information area in an opposite manner than the shift key; pressing ctrl and arrow keys may select adjacent information areas.

It is noted that the key assignments for the single and multi-key commands described above are exemplary, and that these functions may be implemented with any desired input keys, mouse selections, or other suitable input devices. These functions may be provided through inherent HTML and JavaScript properties in conjunction with custom, event-driven JavaScript logic, for example, or through other known mechanisms.

Figure 3A:
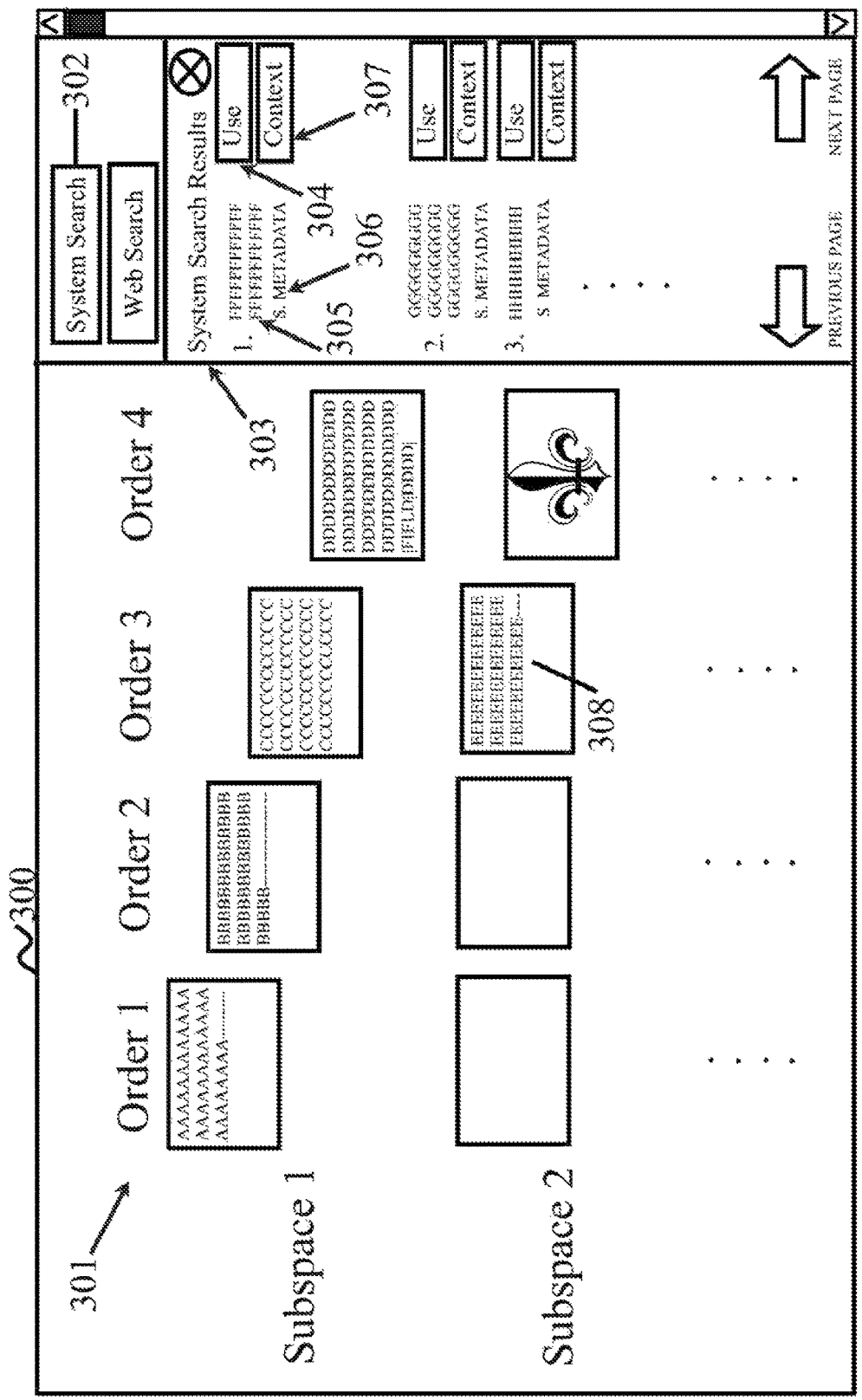
FIG. 3A is a diagram which illustrates an example computer interface for conducting a search of data.
Figure 11:
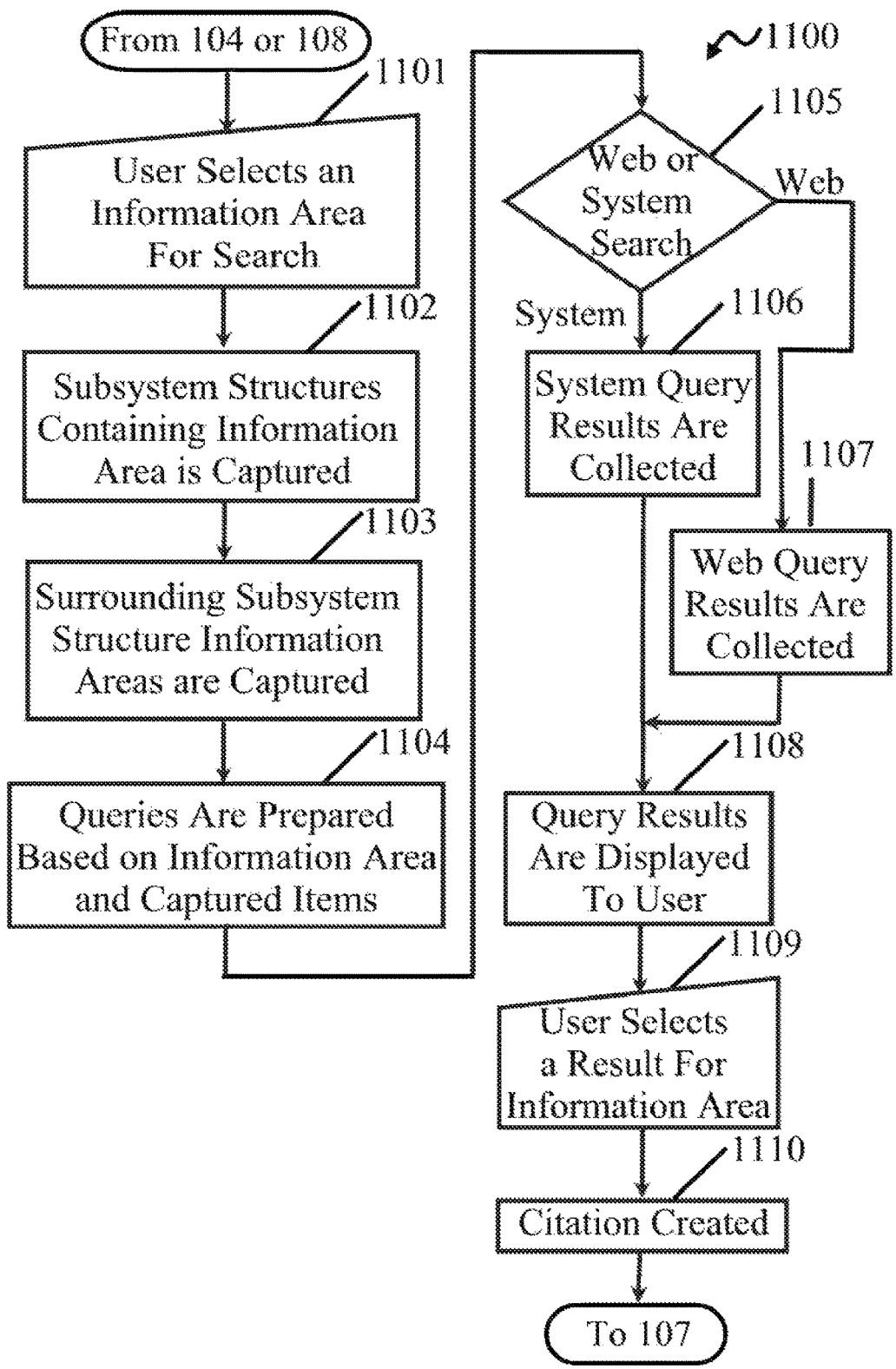
FIG. 11 is a flow chart which illustrates an example searching algorithm.

FIG. 3A is a diagram which illustrates an example computer interface 300 configured to conduct a search of data that is in an information area subsystem structure format. FIG. 11 is a flowchart which illustrates an algorithm which is usable with some configurations of computer interface 300. Interface 300 may be similar to interface 200 as shown and described with respect to FIG. 2B, except that interface 300 is configured to use the system description 301 to conduct a search. In the example shown in FIG. 3A, the search targets a specific information area 308. The search may be initiated using a panel button 302, which may include a standard HTML button input, however any other suitable input may be used for initiating the search. Search results pane 303 may as a result be populated via executed JavaScript and innerHTML commands (or other suitable functionality). Each search result may contain a text description 305 of what is proposed for insertion into the information area 308 and metadata 306, which may help the user to determine how trustworthy and reliable the text is for example. The user may have the option for any result to use text displayed for the information area by clicking the respective "use" button 304, or see the whole system information related to the text displayed by clicking the respective "context" button 307. Each of buttons 304 or 307 may be standard HTML button inputs, although any suitable input for selecting these functions may be used. The use button 304 may activate a JavaScript, Ajax, and/or server-side script to place the text 305 or information represented by text 305 (depending on the desired implementation) into the information area 308 and into an appropriate database table row and column (not shown). Clicking the context button 307 may execute JavaScript to open a new browser window/tab (not shown) with a relative URL displaying the system information. It is noted that the context button may be configured to only appear if the author has shared other system information, and may use JavaScript and/or server-side scripts to find other system information.

Figure 3B:
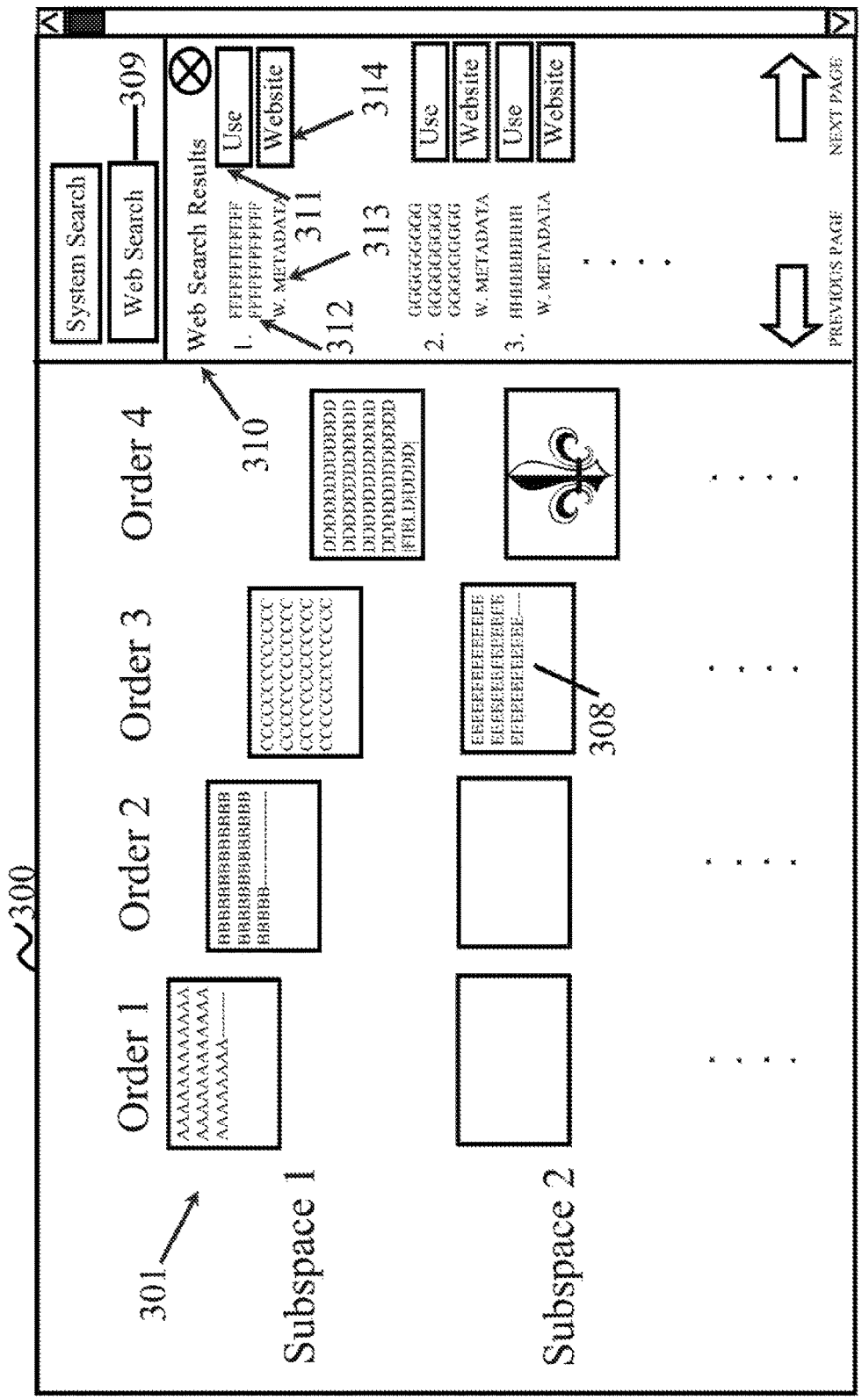
FIG. 3B is a diagram which illustrates an example computer interface for conducting a search of data contained in websites.

FIG. 3B is a diagram which illustrates example computer interface 300 configured to conduct a search of data that is in a web page format. The configurations of interface 300 shown in FIG. 3A and FIG. 3B are similar, and the FIG. 11 flowchart of FIG. 11 also describes an algorithm which is usable with the configuration of FIG. 3B. The same overall system information display 301 and information area 308 of FIG. 3A are also presented in FIG. 3B. However the web search functionality of FIG. 3B may be executed using panel button 309, and a website button 314 is displayed rather than context button 307 for interaction with information was obtained from a web page. Activation of website button 314 may cause the website corresponding to the displayed text 312 to be displayed. This display of the website corresponding to a search result is analogous to the display of an information element corresponding to a search result as described with respect to FIG. 3A. Metadata 313 (FIG. 3B)

may differ from metadata 306 (FIG. 3A) as web pages may have different attributes or types of attributes than information area-subsystem structure formatted information. Further, if the user decides to use the text given (i.e. to input this text into information area 308), use button 311 may be clicked or otherwise selected, which may perform the same functionality as described with respect to FIG. 3A (i.e., populate information area 308 and an appropriate area within a database with the information).

Figure 4:
FIG. 4 is a diagram which illustrates an example computer interface showing conversion between an information area-subsystem structure format and one or more other formats.
Figure 4:
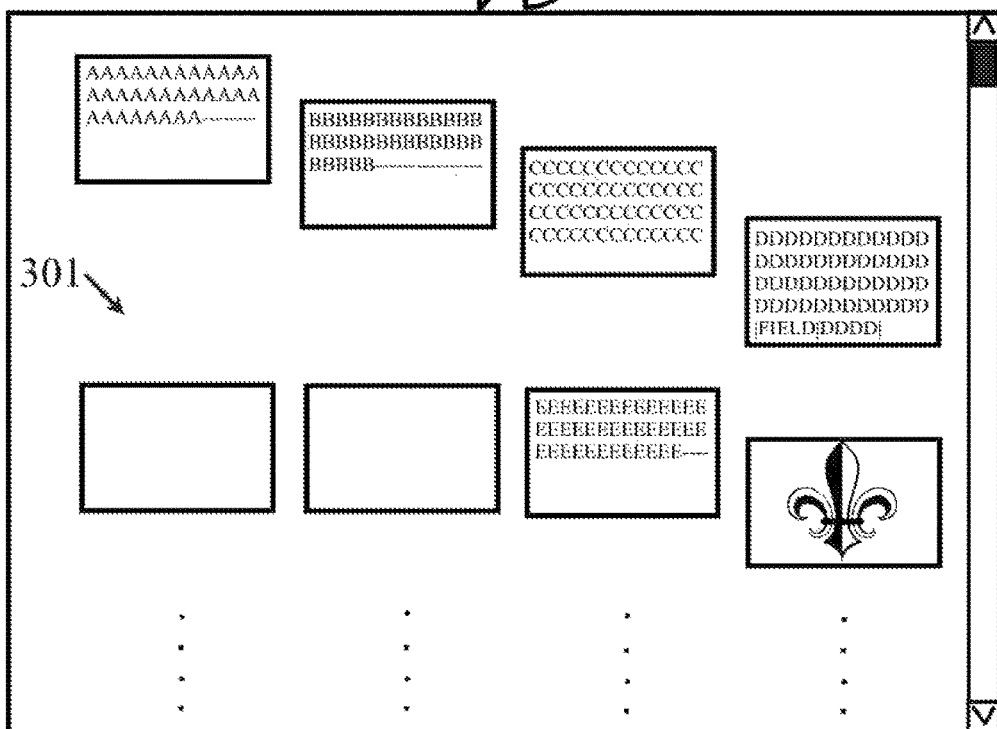

FIG. 4 illustrates an example conversion 402 of a document 400 between another format 401 and the information area-subsystem structure format 301 described with respect to FIGS. 3A and 3B. FIG. 11 is a flowchart which illustrates an algorithm which may be used to effect the conversion described with respect to FIG. 4, and the interface shown and described with respect to FIG. 2A may be used to effect the conversion. In this example, a file or website may be selected by the user and the file may be uploaded to a server. A user may select to convert a document, for example by selecting a topic icon 205 representing the document (FIG. 2A), and then by selecting the location of the document. The user may also specify what conversion preferences should be used, for example by selecting a command icon 206. After executing JavaScript, Ajax, and server-side scripts (or other appropriate functionality), the data in format 401 may be parsed or otherwise placed into database tables (not shown) in an information area-subsystem structure format corresponding to format 301. As a result, the data may be displayed as shown in FIG. 4 and may be organized and/or interacted with in the manner shown and described with respect to FIGS. 2A and 2B. This procedure may be reversed, to effect a conversion 403 from the information area-subsystem structure format 301 to the other format 401. In this case, the interface 200 as shown in FIG. 2B may be used. The user may select to convert a document, for example by selecting a topic icon 205 representing the system description 301, which is in an information area-subsystem structure format. The user may also specify what conversion preferences should be used, for example by selecting a command icon 206. After executing JavaScript, Ajax, and server-side scripts (or other appropriate functionality), the system description 301 may be converted to another format corresponding to format 401. As a result, the data may be displayed as shown in FIG. 4

Figure 5:
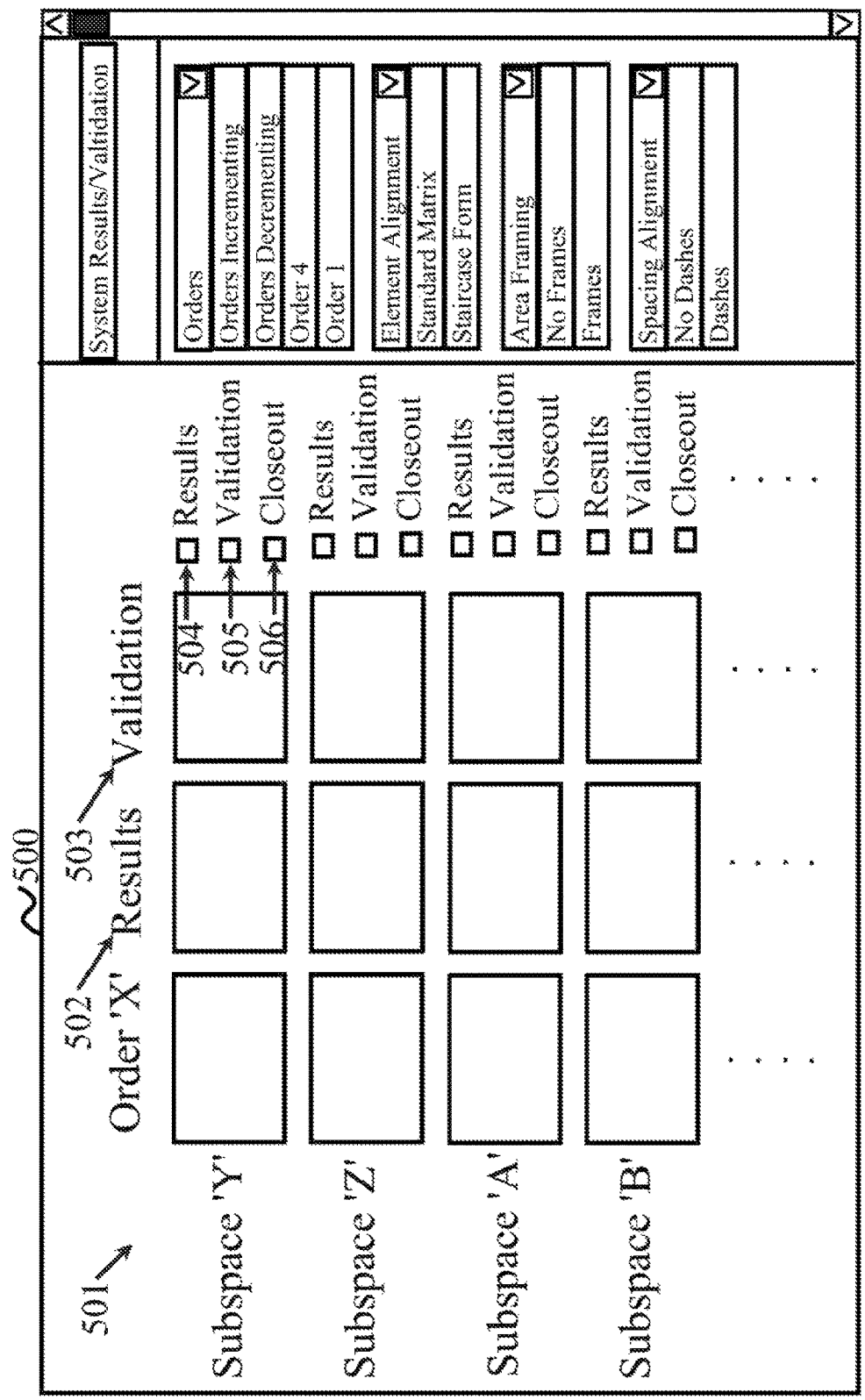
FIG. 5 is a diagram which illustrates an example computer interface showing system results and validation functions.

FIG. 5 shows an example computer interface 500 illustrating system results and validation functions. Interface 500 is similar to interface 200 shown and described with respect to FIGS. 2A and 2B, and may be used to test or otherwise evaluate a system descriptions (such as system description 301). For example, a user may desire to examine one or more orders of a system description, and accordingly a full or a partial review of the system description may be performed. The computer interface 500 may accordingly show order 4, order 1, or order X information areas. order X will display either order 4 information areas first, then order 3 information areas, then order 2 information areas, and finally order 1 information areas; or order 1 information areas first, then order 2 information areas, then order 3 information areas, and finally order 4 information areas. The display may be dependent on whether the orders are selected to be incrementally or decrementally displayed respectively. For each order, event-driven JavaScript (or other suitable functionality) may be executed to change the HTML (or other suitable code) for the order title and/or to load different information areas from the database into the information areas of order X.

In operation, the user may examine the certain order or orders contained within the various subspaces. After performing any appropriate action and analysis, the user may record a result 502 of the information area. Result 502 may include a note regarding the content of the adjacent subspace for the order shown for example. The user may also compare the result to a believed result, and record the similarities or differences in the validation 503 of the result 502. Finally (or at any time during the result and validation process), the user may indicate whether the results 502, validation 503, and/or the entire information area analysis 501 for a particular subspace are complete by selecting a checkbox 504, 505, or 506 (or other selection mechanism) respectively. Such completion indicators may have the advantage of allowing the user partially fill in the results or validation fields, and/or to remind the user to redo the fields at a later time. Each of the aforementioned recording areas may have the same properties of the information areas in FIG. 2B and analogous algorithm execution. However, a database table used to store the results, validations, and analysis completions may be different, and may be linked to the information areas via references.

Figure 6:
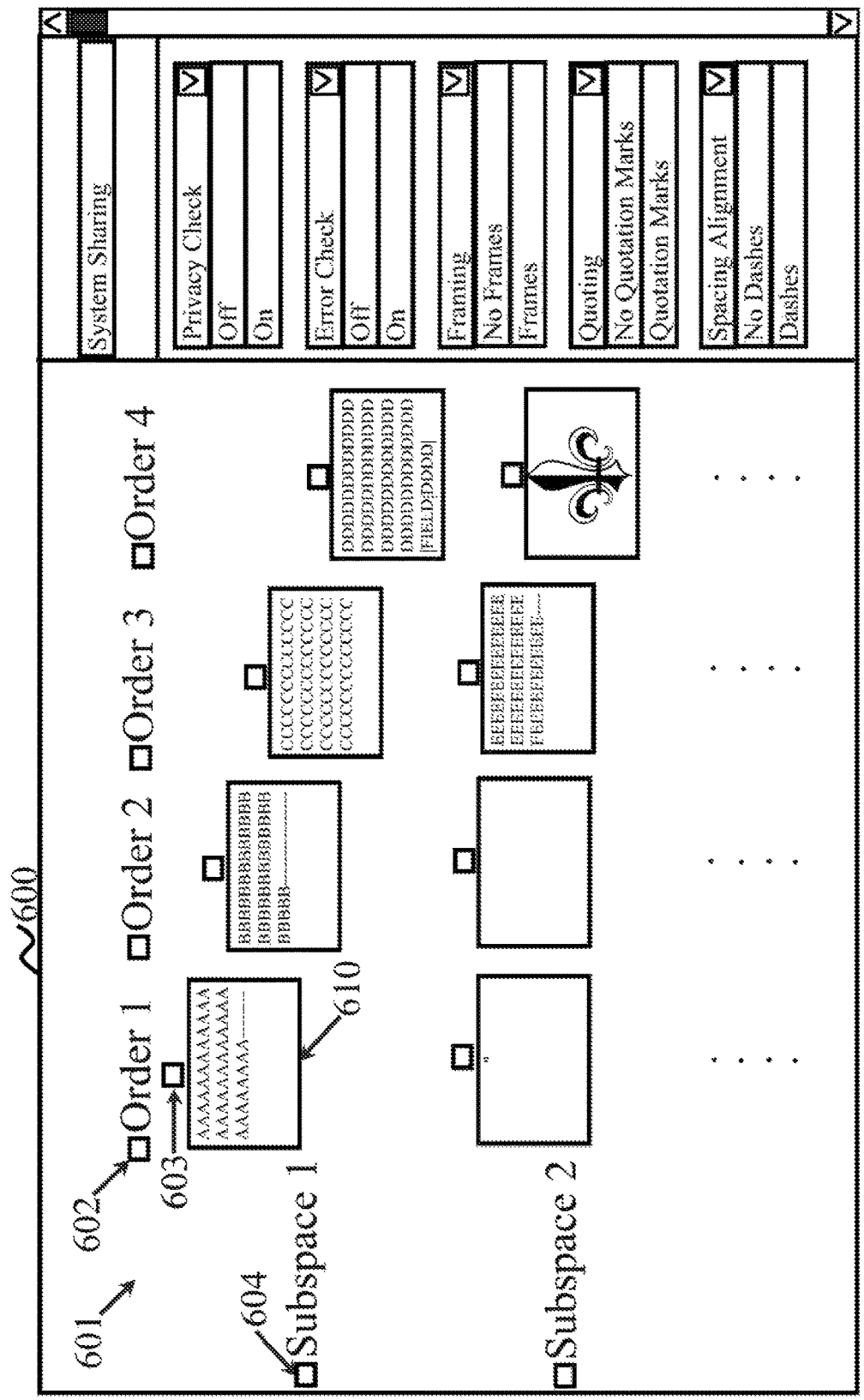
FIG. 6 is a diagram which illustrates an example computer interface for sharing system information.

FIG. 6 shows an example computer interface 600 which illustrates sharing of system information functions between users. The computer interface 600 is similar to interface 200 shown and described with respect to FIG. 2B, and the FIG. 10 flowchart describes an algorithm which may be used with interface 600. Interface 600 may also incorporate a validation (not shown) similar to 503 as shown and described with respect to FIG. 5. The sharing interface 601 may include a number of boxes or other indicators which may be used to select information to be shared. Sharing may be done on an order(s), subspace(s), or specific information area(s) basis, or any combination thereof. For example, box 602 may be selected to indicate that all information areas within order 1 should be shared. Box 603 may be selected to indicate that information area 610 specifically should be shared. Box 604 may be selected to indicate that all information areas within subspace 604 should be shared. The boxes may create flags which indicate which elements should be shared. The flags may be communicated to a server via JavaScript (or other suitable mechanism), possibly following a confirmation. A server-side script may then create new, public database tables that may copy or not copy information of the original, private table based upon the flags indicating which elements should be made public. Further, a reference (not shown) may provide the user with write control over the public table (not shown), in case sharing needs to be modified. The write control may be authenticated through a Session ID assigned at login.

Figure 7:
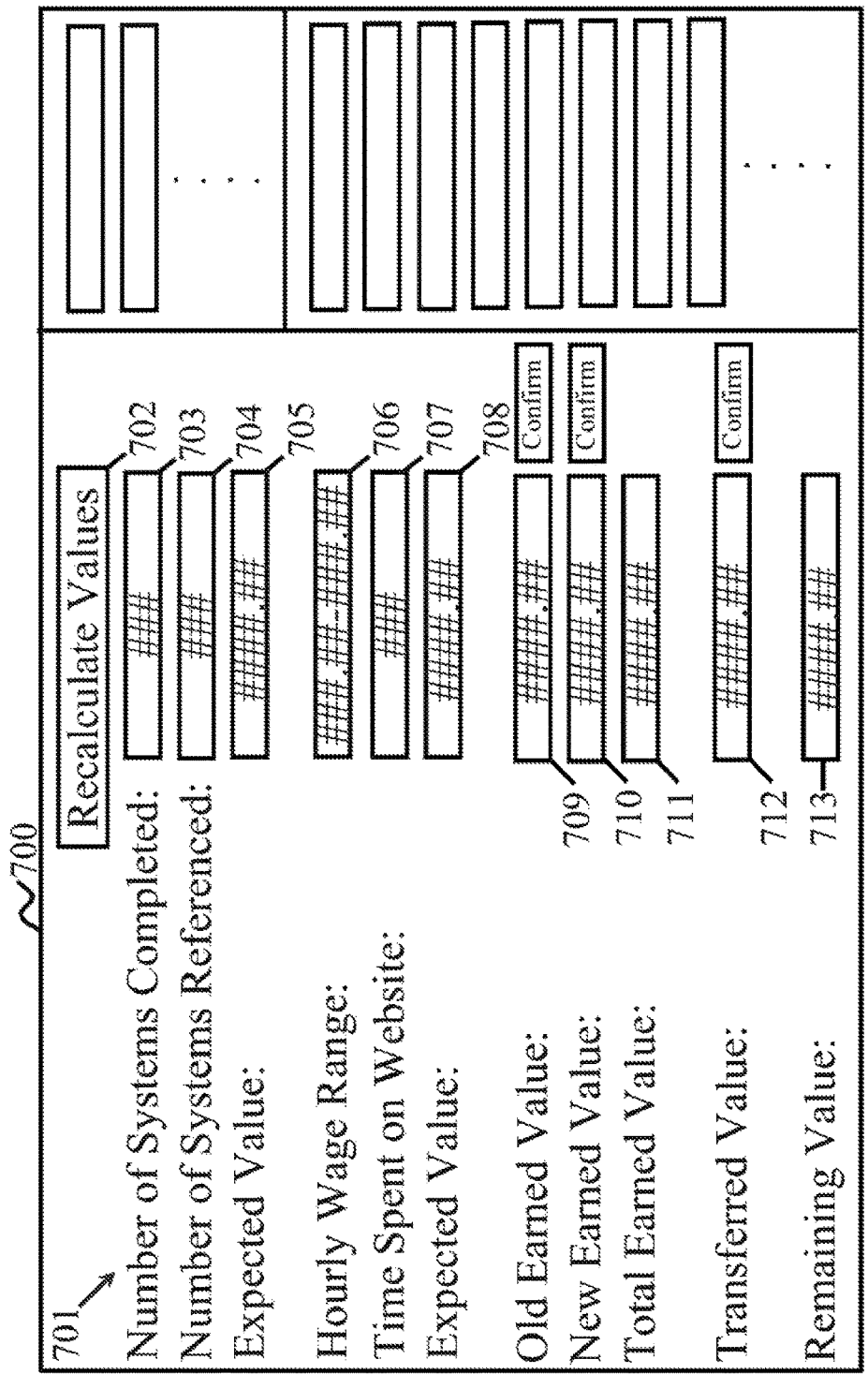
FIG. 7 is a diagram which illustrates an example computer interface for billing functions.

FIG. 7 shows an example computer interface 700 which may be used for billing. Interface 700 may allow input from a user, and/or from other algorithms. The user may fill an hourly wage range field 706, old earned value field 709, new earned value field 710, and transferred value field 712. Old earned value field 709 may indicate what the user believes to have been gained at the time the last earned value calculation was completed. New earned value field 710 may indicate what the user believes to have been gained since the last earned value calculation.

The other fields may be input from algorithm outputs. The number of systems completed field 703 may be calculated by determining how many order 1 information areas are closed out for example. The order 1 closeouts may be direct or indirect, such as closing out all subspace information areas or closing out all order 4 information areas associated with the order 1 information area for example. The number of systems referenced field 704 may be based on the number of citations of system information in subspace structure-information area format originally authored by others. The value expected field 705 may be determined by a similarity with other users concerning the aforementioned information and may be obtained through a server-side script. The server-side script may determine the value expected by analyzing database tables reflecting value earned by other users. The values for each user may be compared, and a median value may be determined for each system group. The user's systems may then be compared to a list of the median values. If there are partial matches of the user's system to the systems of other users, the values of all significantly matching systems may be weighted according to a degree of similarity of the respective match. Any systems for which a similarity is completely unknown may be assigned the median value of a generic system.

For a second calculation of expected value, the amount of time spent on the website may be used. The amount of time spent on the website field 707 may be populated based on a recording log which tracks login and logout times through session management or another suitable mechanism. The difference between the login and logout times may be stored in a database table as the amount of time on the website, assuming the user is actively on the website while logged in. By multiplying the amount reflected by the time spent on website field 707, by the hourly wage rate field 706, the expected value field 708 may be calculated. To prevent manipulation of system values by malicious users, the performance-based expected value field 705 and time-based expected value field 708 may not be allowed to differ by more than a specified amount.

The performance-based expected value field 705 and time-based expected value field 708 may be used to guide a user's opinion of the value earned. The user may then make a decision regarding the value earned and may populate the old earned value field 709 and new earned value field 710. The total earned value field 711 may be calculated by summing the old earned value field 709 and new earned value field 710. The user may then send a payment, which may be recorded in the transferred value field 712. Any difference between the total earned value field 711 and transferred value field 712 may be recorded in the remaining value field 713.

Figure 8:
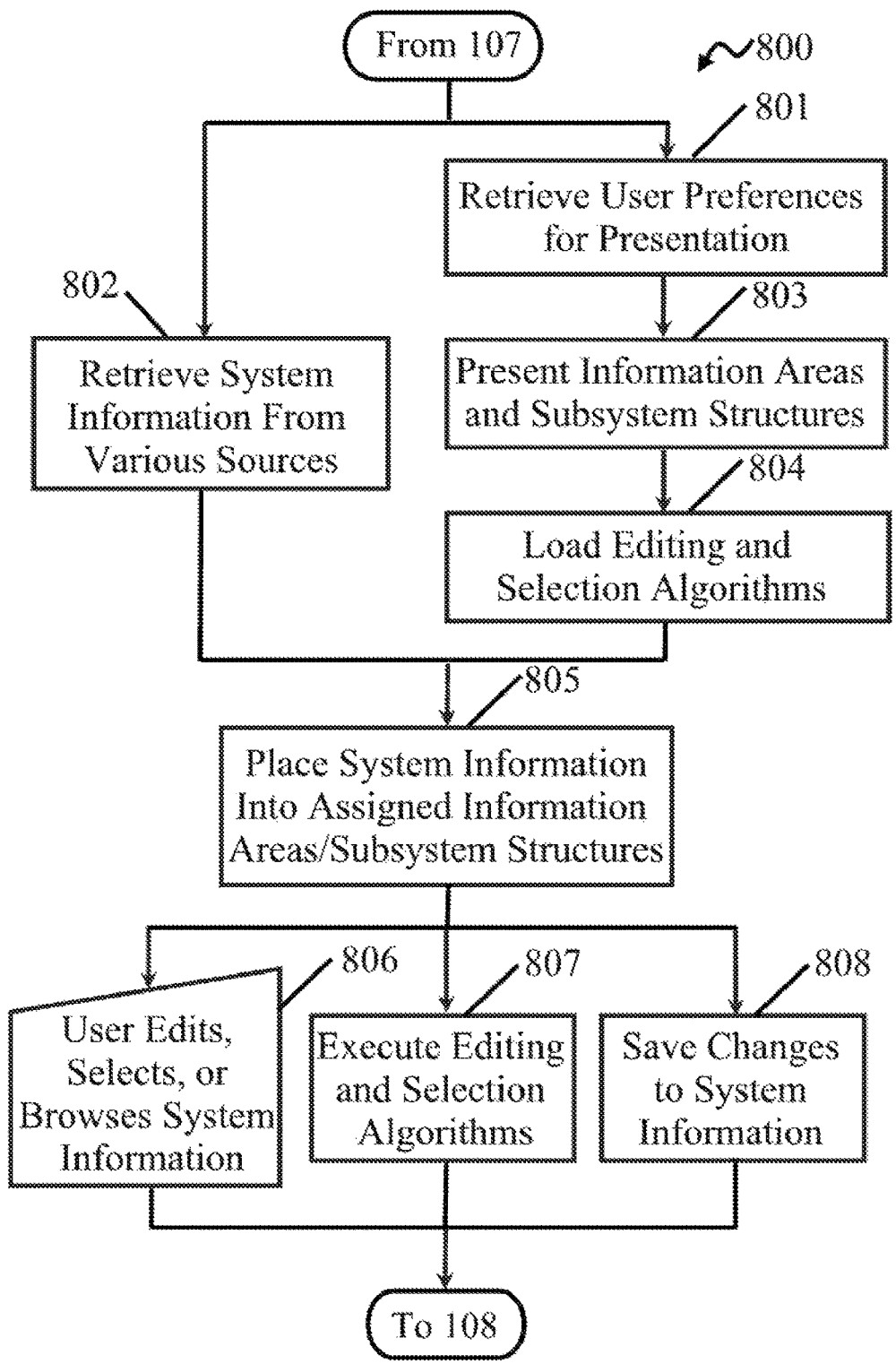
FIG. 8 is a flow chart which illustrates an example system information viewing, editing, storage, and retrieval algorithm.

FIG. 8 illustrates an example system information viewing, editing, storage, and retrieval algorithm 800. Algorithm 800 may first execute two paths concurrently, which may reference server-side and JavaScript algorithms. On the server-side, system information contained on the server or on other servers may be collected in a step 802. The system information may primarily be collected by accessing database tables. On the client-side, the client may request the system information to be presented in a step 801. As a result, the client may receive a HTML presentation and corresponding JavaScript from the server reflecting the user's preferences, for example, whether order 1 or order 4 should appear on the left-hand side of the computer interface. The presentation may then be displayed on a screen in a step 803, followed by JavaScript execution in a step 804. The JavaScript may be responsible for setting the default values and dynamic presentation of the information areas and subspace structures displayed in step 803. For example, the JavaScript may set values to determine if TEXTAREA objects should have borders and the use of quotation marks. The JavaScript code may also contain event handlers responsible for editing and selection functions, such as functionality for the use of Ctrl and Right Arrow keys to focus on a particular information area.

The system information may then be placed in the presentation layout in a step 805. In step 805, the client, through making Ajax calls to the server for example, may receive the system information. The system information may be contained in database tables. Then JavaScript may execute to place the system information received in the correct information areas, since the information area placement may change based on the user's preferences. Positioning functions may be executed through JavaScript to produce the staircase form.

Following step 805, the user may complete editing, selection, or browsing tasks on the system information in a step 806. For example, the user may fill in subsystem structures or may view a particular information area. JavaScript event-handlers may be used for editing and selection may be executed in a step 807 depending on what actions the user takes. Event-handlers may allow for the inherent functions of HTML to be supplemented by extra functions contained in JavaScript. Finally, through Ajax calls for example, the system information may be saved in a server's database tables in a step 808. The system information may be saved for example by keeping track of which information areas were edited and saving those particular information areas. The editing function may rely on JavaScript or other suitable functionality to determine what information area is selected and to save the information area's state in the database. If the user selects another information area, the saved value of the previously selected information area may be compared to its current value. If the saved and current values of the information area are different, the information area may be targeted by the Ajax call or other suitable functionality. It is noted that that the save functionality may be primarily for TEXTAREA objects, since other forms of information, like pictures and videos, may usually be uploaded as files.

Figure 9:
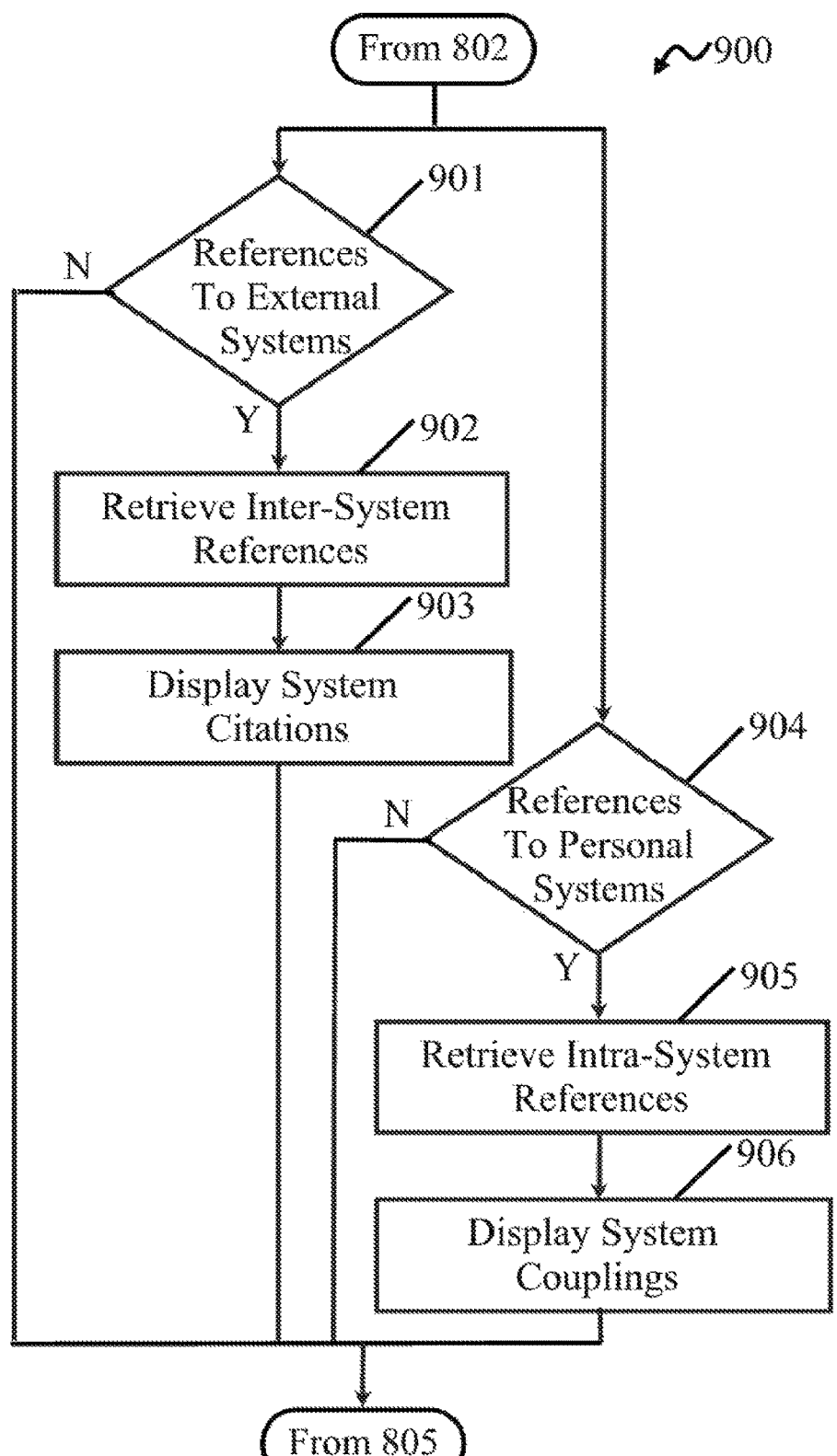
FIG. 9 is a flow chart which illustrates an example inter-system and intra-system reference algorithm.

FIG. 9 illustrates an example inter-system and intra-system references algorithm 900. Such inter-system and intra-system references may be referred to as citations and coupling respectively. The reference data may be stored in a database table column directly adjacent to the order columns, or in another suitable location. The reference data may be in the form of a list and may contain one or more of the following: identification (ID) of a system information database table; ID of a system information database table row; and/or a column coordinate of a system information database table row. It is noted that the database table ID may be required for citations, and the database table row ID may be required for coupling. It may be determined whether any intra-system or inter-system references exist in steps 904 and 901 respectively. If intra-system or inter-system references exist, the inter-system and intra-system reference values may be retrieved for the client computer in steps 902 and 905 respectively. Server-side and Ajax code may be used for this retrieval. Citation or coupling links may be created in steps 903 and 906 respectively.

In the case of coupling, the linked subspaces can extend or supplement one another. Extensions may be completed by modifying the order numbers of the linked subspaces. For example, subspace 1 can include orders 1 through 4. Subspace 2 can continue subspace 1 by including orders 5 through 8. Supplementation may occur when two or more subspaces have the same orders, but have different information areas. This may mean, for example, that the subspaces are not truly distinct, but related since due to an overlap of two or more information areas in the same order.

Figure 10:
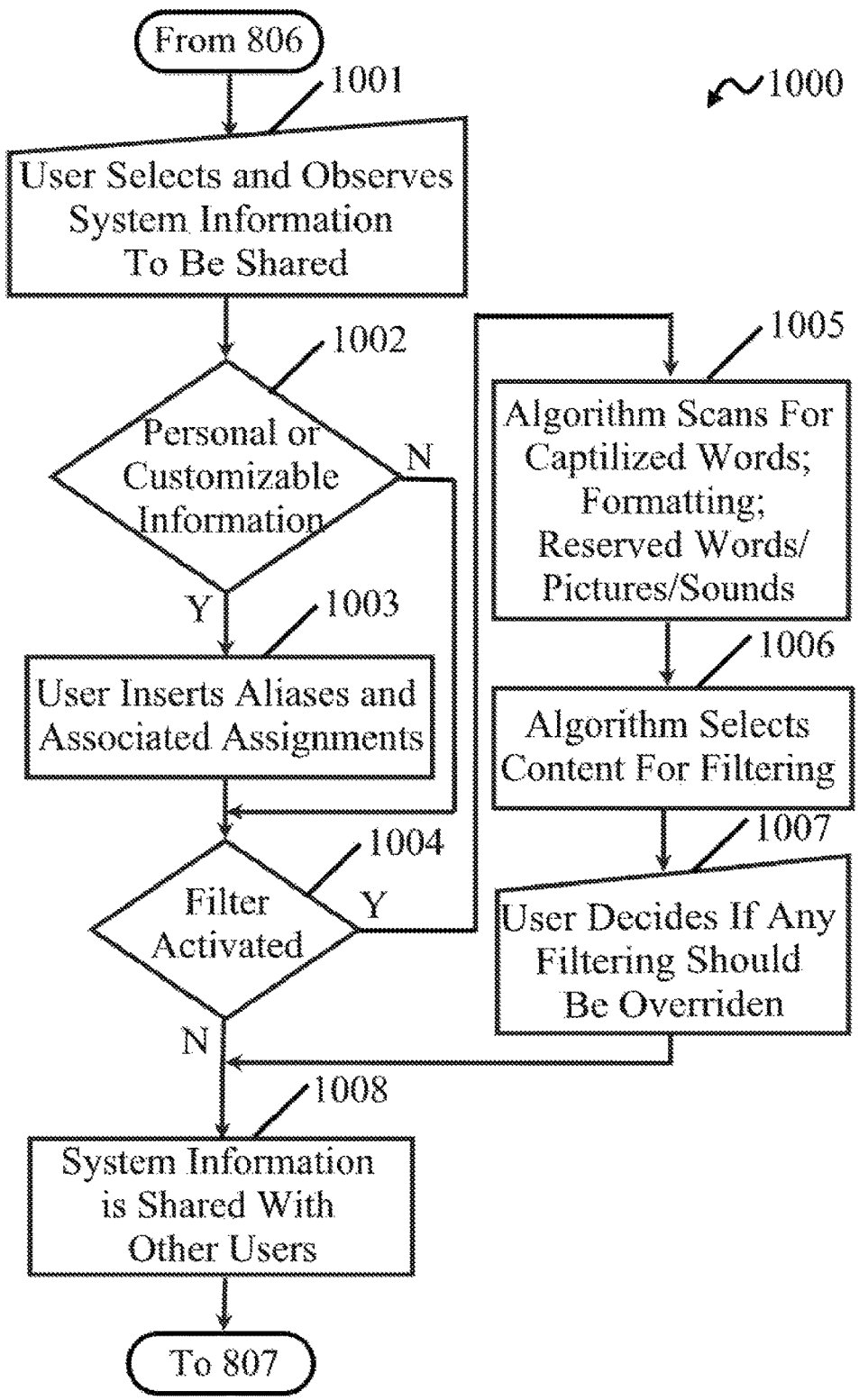
FIG. 10 is a flow chart which illustrates an example system information filtering and alias algorithm.

FIG. 10 illustrates an example system information filtering and aliasing algorithm 1000. A user may indicate that that his or her system information should be shared with others in step 1001. It may be determined whether user wishes to prevent certain information from being shared. The user may indicate that he or she wishes to prevent certain information from being shared using an aliasing approach in step 1002. In the aliasing approach, the user may manually enter text that will mask (i.e. replace in the display) text that the user wishes to be private. A generic term may be used to represent a particular object; for example, all instances of the name "Sara" may be replaced with the alias text "Person 20." The alias text may be used for display, a linked copy of the data may be created, and/or a program may be executed to replace the text with the alias text prior to access by another person. The user may be provided with functionality to choose alias text which may represent the nature of what has been excluded, for example, a user, place, thing, action, or modifier. The alias text and the masked text may be related and/or delimited through the use of special characters in step 1003.

In one possible implementation, the user may share the system information using a command, and JavaScript and Ajax (or other functionality) may send the system information to a server. A server-side script may then be run, which may use regular expressions or other suitable functionality to find any aliases in the system information. If there are any aliases, the regular expression may replace all text delimited by the special characters with the alias text. The system information may then be shared with other users by placing the database table in a public access area. Accordingly, if another user views the system information, the alias text will be shown in the masked areas, and the special characters or the private information of the author will not be visible. For pictures and video, a tool may be provided for the user to replace part of a picture with a substitute picture through simple picture overlay functions.

The user may indicate that he or she wishes to prevent certain information from being shared using an automatic filter approach in step 1004. The filter may prevent information areas from being shared unless overridden by the user. The filter may search some or all of the information areas for content that fits certain patterns in a step 1005. For example, the filter may search for words with capitalized letters, text that looks like an address or phone number, text that matches reserved words, and pictures matching a certain pattern using pattern recognition software. The filter may perform such functions using server-side scripts or other functionality that is activated either manually automatically before sharing. The command to apply such filtering may be applied using JavaScript and Ajax in either case. If the filter finds an information area containing content designated for filtering, that information area may be deselected for sharing in a step 1006. The user, if desired, may reselect the information area in a step 1007 by overriding the filter for example. The system information may thereafter be shared by the user for public consumption in step 1008.

FIG. 11 illustrates an example system-based and web-based, user-initiated, and single information area searching algorithm 1100. Using this algorithm, a user may select an information area as an input to a search, may conduct a search of other accessible systems or other sources of information such as the Internet, may display the search results to the user, and may permit the user to select from among the results to populate the information area.

A user may select a target information area in step 1101. The external value may come from either a system information database table, or from a web search. Information about subsystem Structures which the target Information area is a part of may be captured in a step 1102. Information regarding surrounding subsystem structures may also be captured in a step 1103. Queries may be prepared based on the information area and the captured subsystem structure information in step 1104. The user may select a dataset for search (e.g. that the search should be of the World Wide Web, or of a particular system or systems) in step 1105. By retrieving the aforementioned items, a context for the search including starting values, context, and/or dataset for query may be established.

The information area value and the subsystem structures may be sent by a client to a server through an Ajax command to the server. Server-side scripts may then receive the information prepared in step 1104 and may use this information to execute a search.

If a system based search is selected in step 1105, system query results may be collected in a step 1106. This collection may be performed by comparing the target information area value, if any, and values of information areas in other systems (in the dataset) corresponding to the subsystem structures that contain the target information area. For example, if the target information area is in order 1 of subspace 1, the search may be from among information areas within the dataset which are in order 1 and subspace 1 of the searched systems. Two types of system-based searching may be performed, and may be referred to herein as group and instantaneous searches.

Group searching may be used to search from among a group of information systems, other databases, or information of similar individuals to the user, based on his or her system information. Periodically, a server-side script will run to match the user's system information with that of other people. The search may use full-text searching based on the system database tables, rows, and columns. Random table elements may be selected from a representative sample of rows and columns. Each element selected may be searched against the system database table elements of others, based on the row and column they occupy. The results of each search may be compared against one another. The databases of users that appear the most across the search results may be incorporated into a group. Accordingly, when the search is initiated, a full text search may be performed among the group members. The full-text search may be performed of information areas in the same column that contains the searched element. Concurrently or consecutively, one or two other elements in the same subspace may also be searched. If the same systems appear in both the target and other element searches, the system may be assigned a higher ranking. If no results or few results occur, then an instantaneous search may be used.

Like the group-based search, instantaneous search may be used to search among a selection of elements taken across a representative sample of rows and columns. The search may include a full-text search. A group may not be used for instantaneous search however. Instead, the full-text searches may be performed upon initiation by the user of the system search. The target information element may be searched against other users based on what row and column it is in. Concurrently or consecutively, other elements in the same row or column may also be searched. If the same systems appear in both the target and other element searches, the system may be assigned a higher ranking.

If a web search is selected in step 1105, web query results may be collected in step 1107. In a web-based search, the target information element text is inputted to the search algorithm much the same way as a user searches using a web search engine. The text of the target information element may be input to the web search engine and the results may be retrieved. Concurrently or consecutively, other elements in the same subspace, order, or related subspace and order may be input to a web search engine. The results may then be compared to the original element results. If a website appears across the results, the website may be assigned a higher ranking.

The search algorithm 1100 may be initiated by a request from a client computer to a server. The server may also receive the text in the target information area, if any, and information regarding the subsystem structures that contain the information area. The transfer of this information may be performed via JavaScript, Ajax, and server-side scripts. The search results output from the algorithm may be displayed to the user in step 1108. For example, the search results may be sent by the server to the client computer via server-side scripts, Ajax, and JavaScript, and may be displayed via innerHTML commands.

The user may select a specific result from among the search results in step 1109. In an example implementation, if the user chooses a specific result in 1109, an Ajax command may be sent to the server. A server-side script may then include a command to insert a database element in step 1110, which may reference the selection as a citation. If the selected search result is a database element of a system, the reference may be to the database table and element contained within. If the selected search result is a website, the reference may be to a database table that contains referenced websites and the element that references the specific website.

Figure 12:
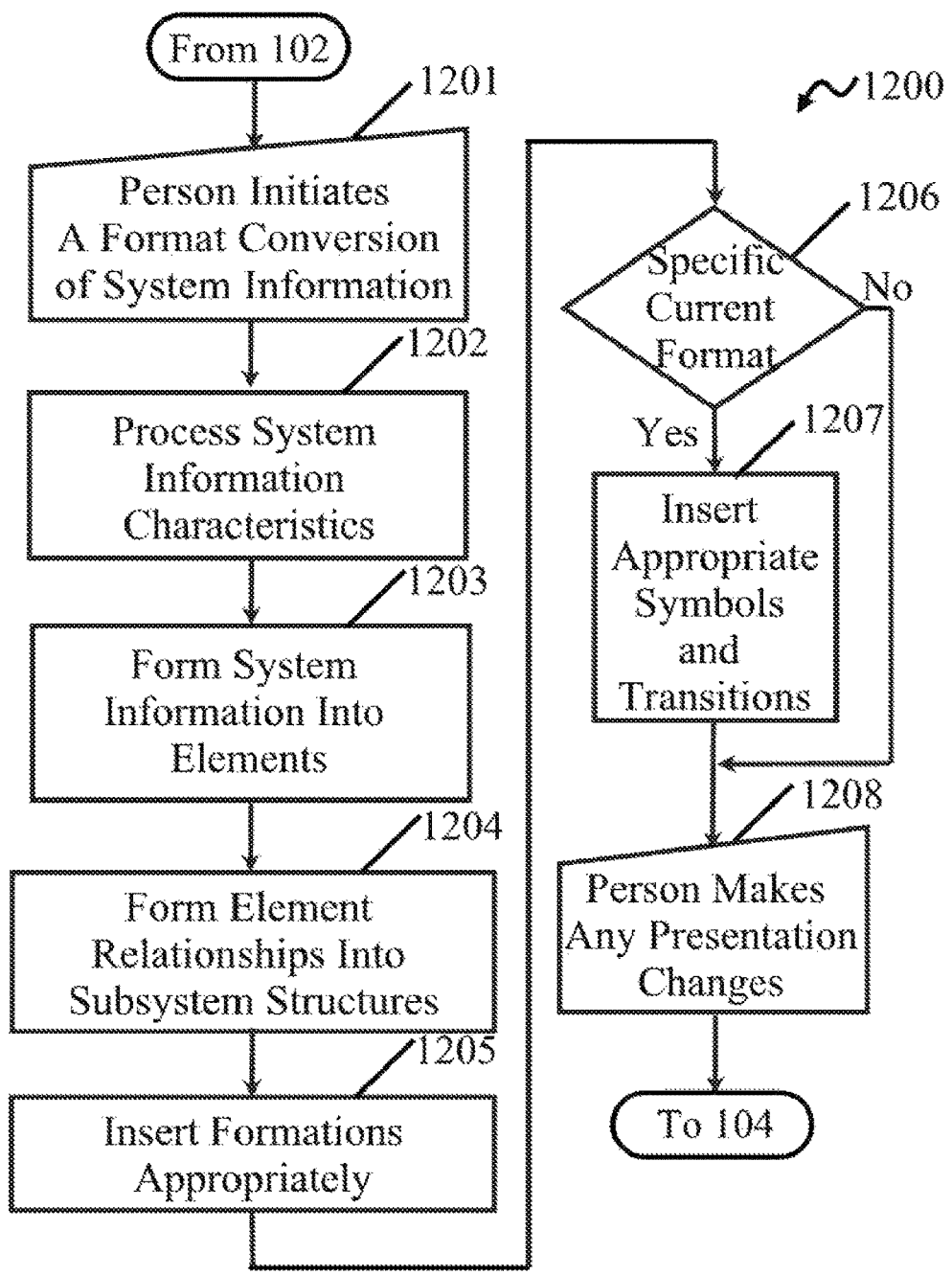
FIG. 12 is a flow chart which illustrates an example system format conversion algorithm.

FIG. 12 illustrates an example system format conversion algorithm 1200 which may convert data between the information area-subsystem structure format and one or more other formats. The conversion may be performed in either direction from information area-subsystem structure to another format, or from the other format to an information area-subsystem structure format. In both cases, the necessary algorithms may be employed, the elements of the system may be identified, the elements may be placed appropriately in relation to each other, and transitions and formatting of the information may be changed. A user may initiate the conversion in a step 1201 if he or she wishes to convert information into or from the information area-subsystem structure format described with respect to FIG. 2A. A user may select an algorithm to automatically convert system information. This may include for example clicking on a web page link to "display in information area-subsystem structure format". In any case, the user's action may send a request to run a server-side script via JavaScript and Ajax or another suitable mechanism.

Such server-side script may then analyze characteristics of the system in step 1202. For example, starting from an information area-subsystem structure format, the server-side script may retrieve the system information database table, while starting from another format, the entire file and any linked files may be analyzed, focusing on similarity of information, synonyms, antonyms, information order, transition statements, listing statements, and grouping, like sentences or paragraphs. The script may interface with a dictionary and/or thesaurus to understand the similarity of information, synonyms, and antonyms. Other text and/or document structure analysis techniques may be employed. The script may then scan the document for information order, transition statements, listing statements, and/or grouping. The script may then utilize the results of this previous analysis to create a cross reference between the current format and the new format, (e.g. what text corresponds to what elements of the information area-subsystem structure format). The script may then parse the document, based on the language or normal reading flow, to obtain the subsystem structures from the order of the elements, transition statements, listing statements, symbols, and grouping. The script may incorporate or access multiple pattern-recognizing subroutines to handle the different respective patterns. Furthermore, the script may incorporate or access functionality to handle the interrelations between the aforementioned subroutines to determine the subsystem structures.

The system information may be formed into elements in step 1203. For example, starting from an information area-subsystem structure format, the attributes of the database table may be used. Starting from another format, the analysis of step 1202 may result in the definition of elements.

Element relationships may be defined in step 1204. For example, starting from an information area-subsystem structure format, the rows and columns of the system information database may be used to define element relationships. Starting from current formats, the analysis of step 1202 may be used, including using information order, transition statements, listing statements, and grouping, to define the element relationships.

The elements and relationships may be inserted into the prescribed format in step 1205. For example, starting from a regular format, a database table may be created, and the elements may be inserted into the table in the specified row and column based on the aforementioned analysis. Starting from an information area-subsystem structure format, the elements may be inserted into a created document based on the type of the current format. For example, if the orders represent order-of-magnitude differences, for a prose format, order 1 data may be contained within the beginning sentence. Order 2 data may be contained within topic sentences for each paragraph. Order 3 data may be contained in topic sentences or inner-paragraph sentences, depending on how much order 4 data is present. Order 4 data may be contained in inner-paragraph sentences. The subspaces define the relative placement of information with respect to one another. For an outline format, FIG. 4 describes an example, where order 1, 2, 3, and 4 correspond to Roman numeral, capital letter, Arabic numeral, and lower-case letter assignments respectively. In any case, the insertions may occur through operations performed by a server-side script.

In step 1206 it is determined whether a specific current format will be the end result of the translation. Such specific current formats may include prose and poetry. For example, specific current formats may try to form a continuity of ideas that imitate or mirror speech. If these types of current formats are selected, further processing may be performed in step 1207 to create the appropriate transitions between the discrete statements. On other hand, formats like outline and fishbone diagrams, are not further processed due to their inherently discrete nature.

If a specific current format that forms a continuity of thoughts is selected as an end result in step 1206, the document created will be modified to include transition statements, or some way of connecting the statements together to have the flow between ideas seem natural to a user, in step 1207.

One approach to reformatting the document in this manner may be generic, based on the language of the user and any dialect considerations. The algorithms may be accessed via server-side scripts that may reference such transitions in separate, specific database tables or files that contain a list of transition statements. For example, such transition statements in United States English may include "for example", "however", "as a result", and "therefore". Such statements may be included between the elements in subsystem structures, and may be inserted by a server-side script or other suitable mechanism that has a record of how the translation originally occurred.

Another approach to reformatting the current document may be based on machine learning. The server-side scripts and files may keep track of previous documents that were translated. When elements and subsystem structures are taken from the documents, the server-side script may store the transition statements that the author used, along with the language and dialect. Accordingly, when the server-side script needs to make a translation to a format similar to what it translated from, it may use the stored transition statements and usage.

After receiving the converted format, the user may then proceed to make any further desired changes in a step 1208. For example, the user may make discretionary changes based on stylistic preference. The output may be editable through third-party software or through client-side algorithms and markups, if the output is in information area-subsystem structure format. If the output is in a current format, the user may choose to upload the file, to give an opportunity for the server to learn conversion improvements.

The foregoing methods, systems, and devices have numerous practical applications. One possible application is education.

Figure 13A:
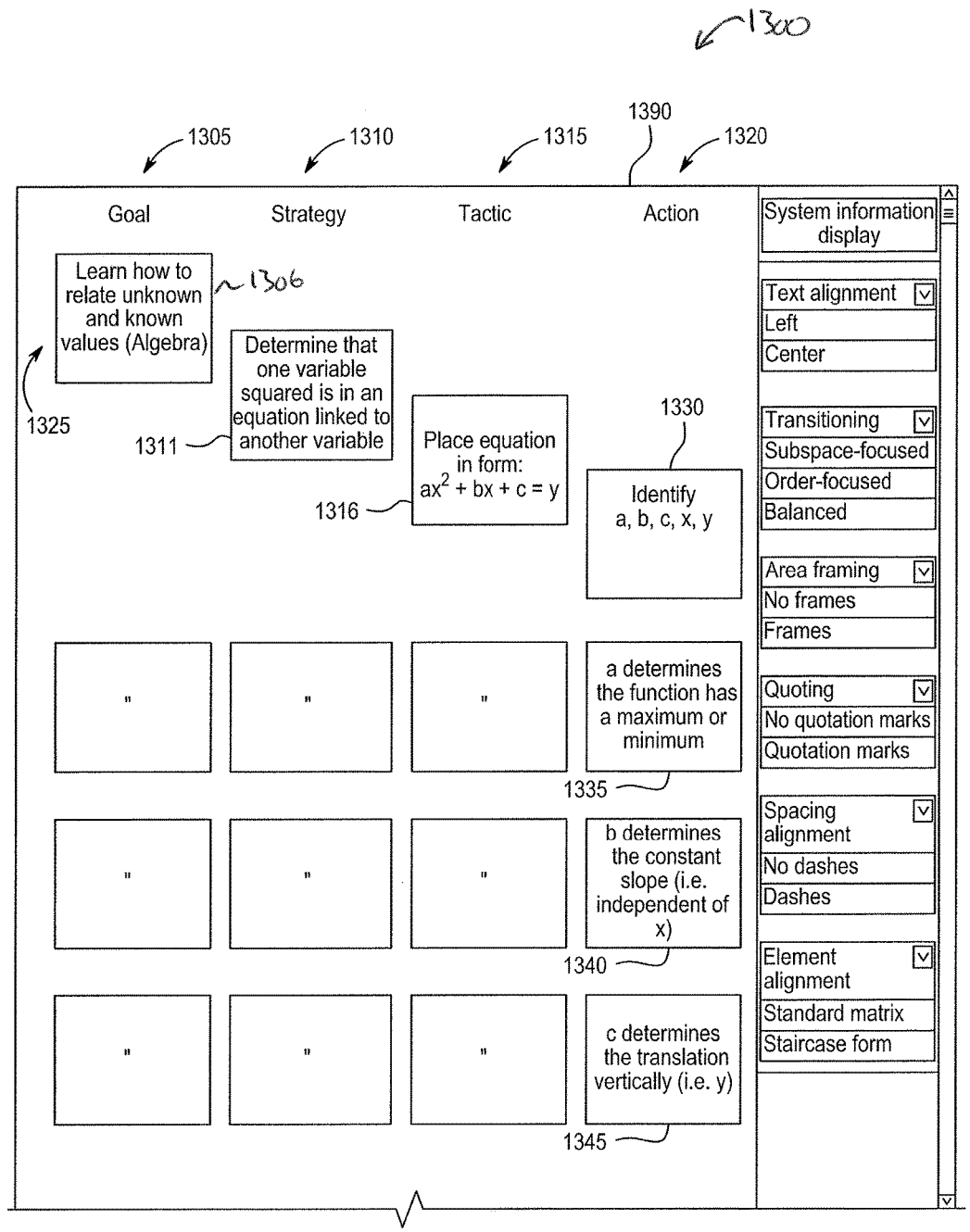
FIGS. 13A and 13B are a diagram which illustrates an example computer interface.
Figure 13B:
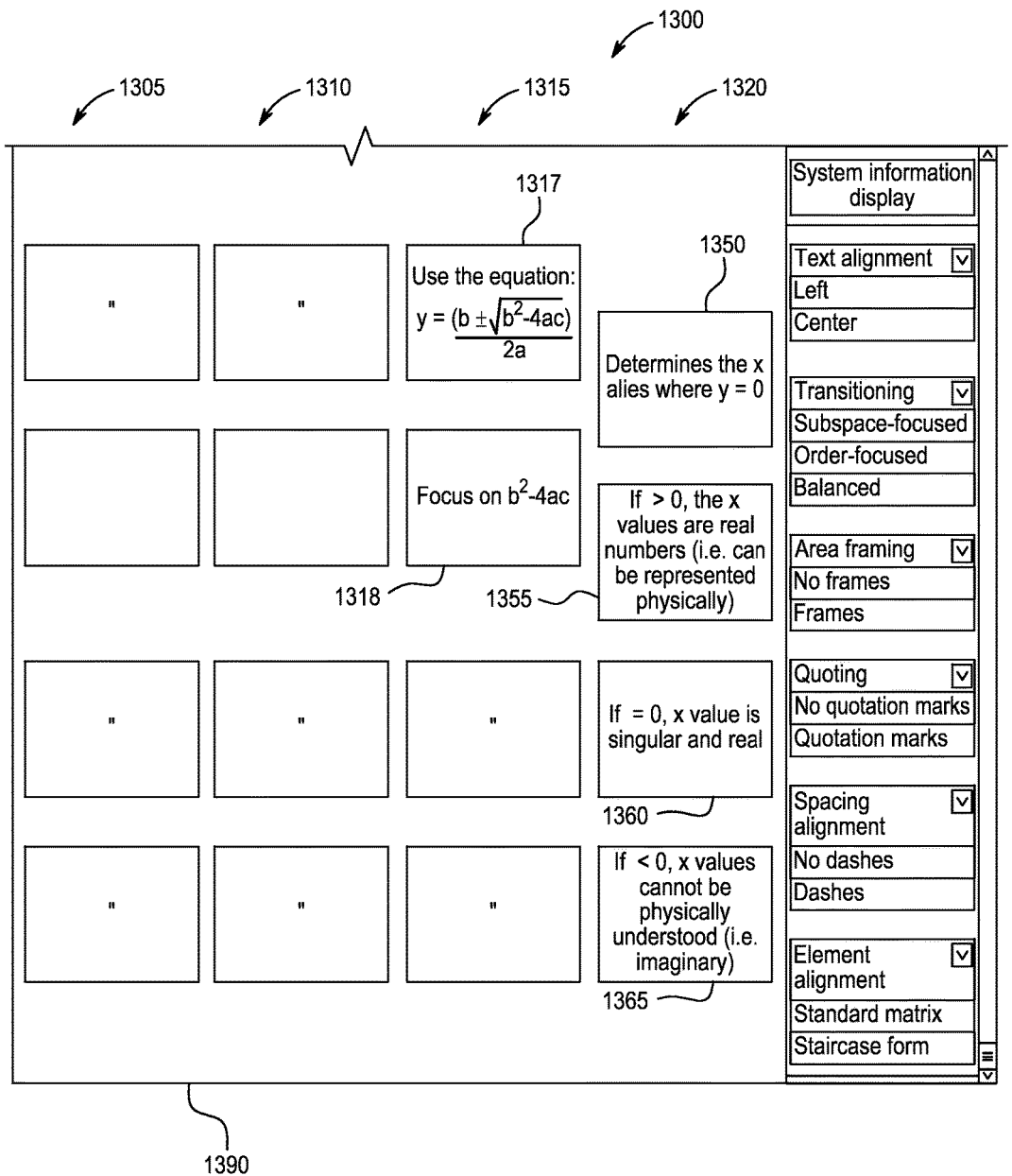

In an example, the foregoing may be used by a teacher in planning and presenting a lecture. FIGS. 13A and 13B illustrate an example lecture 1300 organized in a manner similar to system description 201 and displayed using an interface 1390 similar to interface 200 (FIGS. 2A, 2B) as shown and described with respect to FIG. 2B. Lecture 1300 is organized into columns 1305, 1310, 1315, 1320 corresponding to four orders, and a row 1325. In this case, the columns 1305, 1310, 1315, 1320 correspond to a goal, strategy, tactic, and action for using a well-known mathematical concept, the quadratic formula. Column 1305 includes descriptions of the goals of the lecture. Goal 1306 (the only goal in this example) describes the goal of the lecture, in this case, to learn how to relate unknown and known values.

Column 1310 describes strategies for addressing the goals of the lecture. Strategy 1311 (the only strategy in this example) describes a strategy for achieving goal 1306, in this case, to determine that one variable squared in an equation is linked to another variable in the equation.

Column 1315 describes tactics 1316, 1317, 1318 for achieving the goal 1306. Tactic 1316 describes a particular tactic, in this case, placing the equation in the form of the general quadratic equation.

Column 1320 describes various actions for carrying out tactics 1316, 1317, 1318. For example, actions 1330, 1335, 1340, 1345 describe actions for carrying out tactic 1316. For example, action 1330 explains that a, b, c, x, and y of the equation should be identified in order to carry out tactic 1316 of placing the equation into the general quadratic form.

Similarly, action 1335 explains that the variable "a" determines whether the function has a maximum or minimum, action 1340 explains that b determines the constant slope, and action 1345 explains that c determines the vertical translation.

Tactic 1317 describes another particular tactic for advancing strategy 1311, i.e., using the quadratic formula in order to solve for x. Tactic 1317 has one associated action 1350, which explains that applying the quadratic formula shown in tactic 1317 will determine a value for x where y=0.

Tactic 1318 describes a further tactic for advancing strategy 1311, i.e. analyzing a particular term of the quadratic formula. Tactic 1318 is associated with actions 1355, 1360, and 1365, which explain that it can be determined whether there are two real values for x, one real value for x, or two imaginary values for x, depending upon whether the term is greater than, equal to, or less than zero, respectively.

It is noted that actions 1330, 1335, 1340, and 1345 relate to tactic 1316, and this relationship may be illustrated by the format of the rows and columns of lecture 1300. This relationship may also be reflected in the underlying database structure (not shown). For example, if action 1330 is represented by a particular data structure (not shown) this data structure may contain the text shown (i.e. "Identify a, b, c, x, y") as well as an indication of the relationship with tactic 1316. This may result in a tree type data structure (not shown) for example.

Column 1315 also contains two additional tactics 1317, 1318. It is noted that tactics 1316, 1317, and 1318 relate to strategy 1311, and this relationship may be illustrated by the format of the rows and columns of lecture 1300. This relationship may also be reflected in the underlying database structure (not shown). For example, if tactic 1316 is represented by a particular data structure (not shown) this data structure may contain the text shown (i.e. "Place equation in form . . . ") as well as an indication of the relationship with strategy 1311. This may result in a tree type data structure (not shown) for example.

Lecture 1300 may be used in several ways. For example, a teacher may use lecture 1300 as a convenient way to organize topics for presenting the lecture. Lecture 1300 may also be displayed using an output device such as a projector or monitor to facilitate the lecture. Further, the underlying database structures (not shown) of lecture 1300 may be used to facilitate further collaborative learning as discussed herein.

It is noted that lecture 1300 and its topic are strictly exemplary and many other applications are possible. In another example, the organized information could relate to an inventory, and the orders could correspond to machine, sections, assembly, and component, for example. Many other applications will be evident to those having skill in the art.

Figure 14:
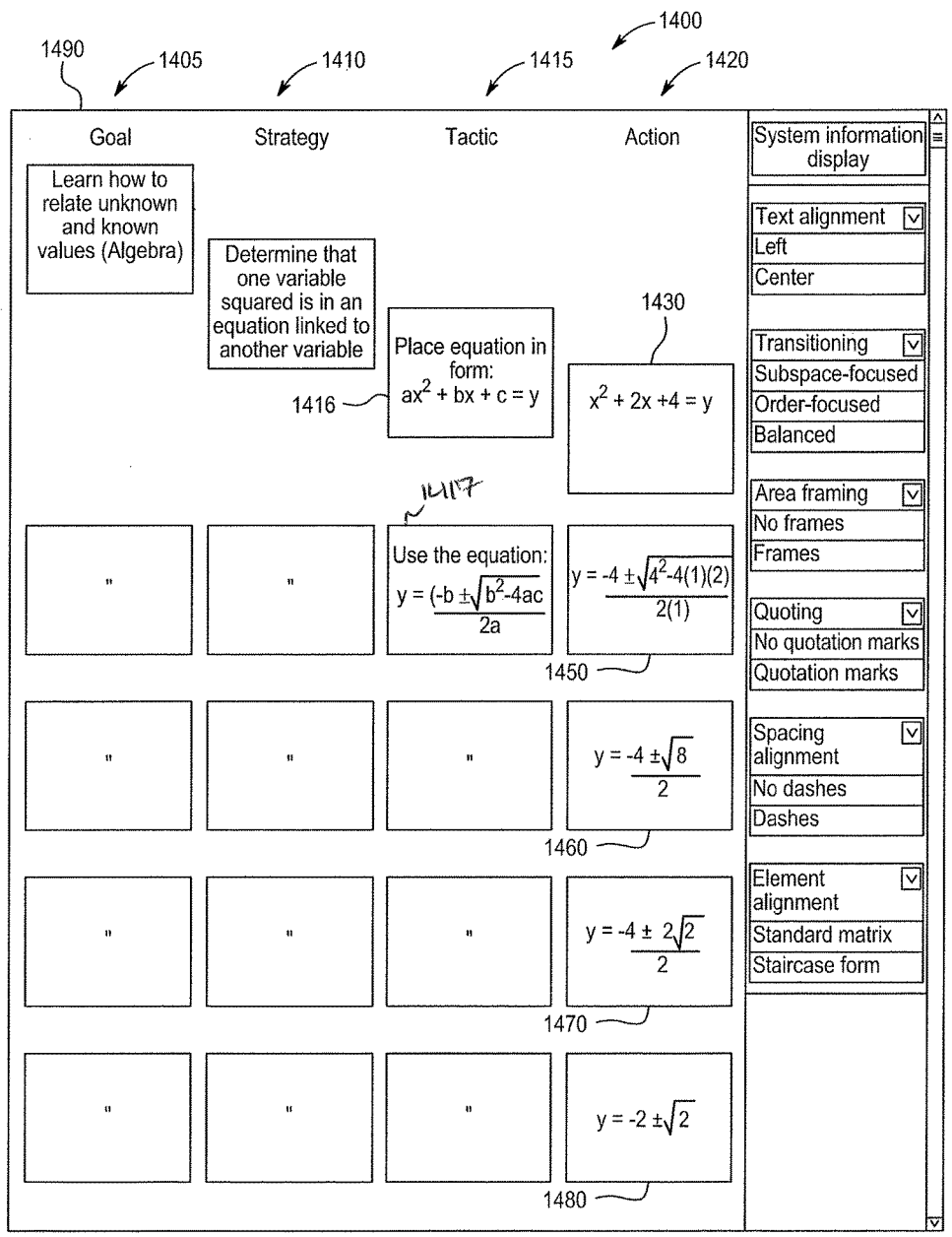
FIG. 14 is a diagram which illustrates another example computer interface.

For example, FIG. 14 illustrates a classwork assignment 1400 organized in a manner similar to lecture 1300 and displayed using an interface 1490 similar to interface 200 (FIGS. 2A, 2B). Columns 1405, 1410, 1415, and 1420 correspond to the goal, strategy, tactics, and actions for using the quadratic formula, as with lecture 1300 shown with respect to FIG. 13. For the classwork assignment however, a student may apply this information to a particular problem; in this case, to find the roots of the equation $y=x2+2x+4$.

Here, the student may perform each action by entering mathematical expressions into fields 1430, 1450, 1460, 1470, and 1480 for actions corresponding to tactics 1416 and 1417. In this way, the student can "show their work" for the assignment in a regularized format that may be conveniently graded, compared with a template, or compared with similar assignments completed by other students.

Figure 15:
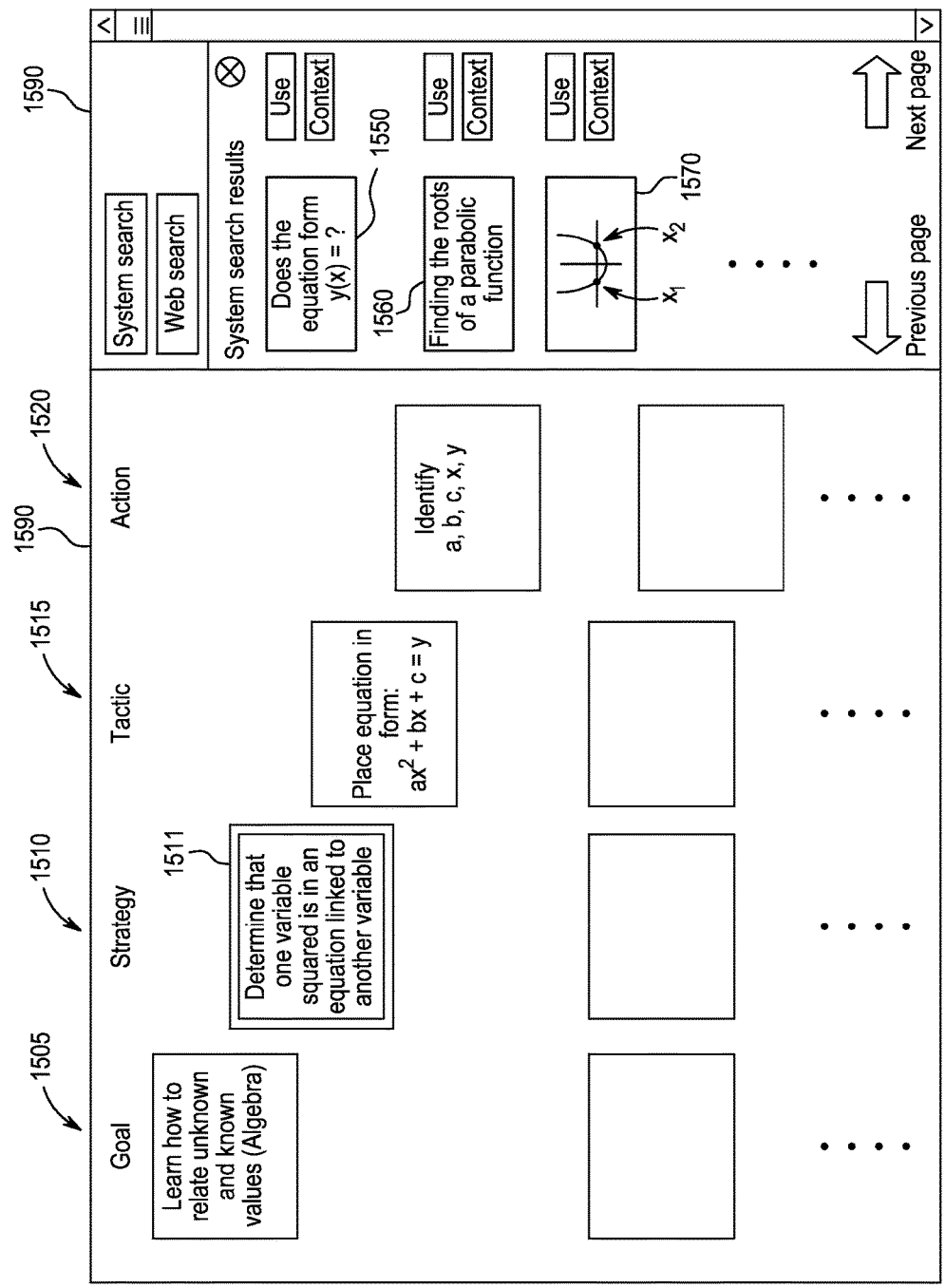
FIG. 15 is a diagram which illustrates another example computer interface.

In another example, FIG. 15 illustrates a collaborative homework assignment 1500 organized in a manner similar to lecture 1300 and classwork assignment 1400 and displayed using an interface 1590 similar to interface 300 (FIGS. 3A, 3B). Columns 1505, 1510, 1515, and 1520 correspond to the goal, strategy, tactics, and actions for using the quadratic formula, as with lecture 1300 shown with respect to FIG. 13. For the homework assignment, the student may be required to find the roots of an equation as with classwork assignment 1400. However the student may be confused and may have several questions about the topic of quadratic equations, such as "Why does a variable need to be squared?" "How many total variables can there be?" "Can't a, b, and/or c be the same, or different?"

In order to investigate these aspects of the topic for self-learning, the student may select from among the various information elements. For example, to investigate the question of why a variable would need to be squared, the student may select strategy 1511, the description of which most closely addresses this question. By selecting strategy 1511, a search may be commenced which may provide results 1550, 1560, 1570 which may be relevant to explaining strategy 1511. Each of these results may present the explanation in a different way, and may have been entered into the system by the instructor or other students for example. The student may then select the answer which they find most helpful for further investigation. The selected answer may also be linked to other information, which the student may also choose to investigate. In this way, students may be empowered to help one another to learn the topic through collaborative learning.

Figure 16:
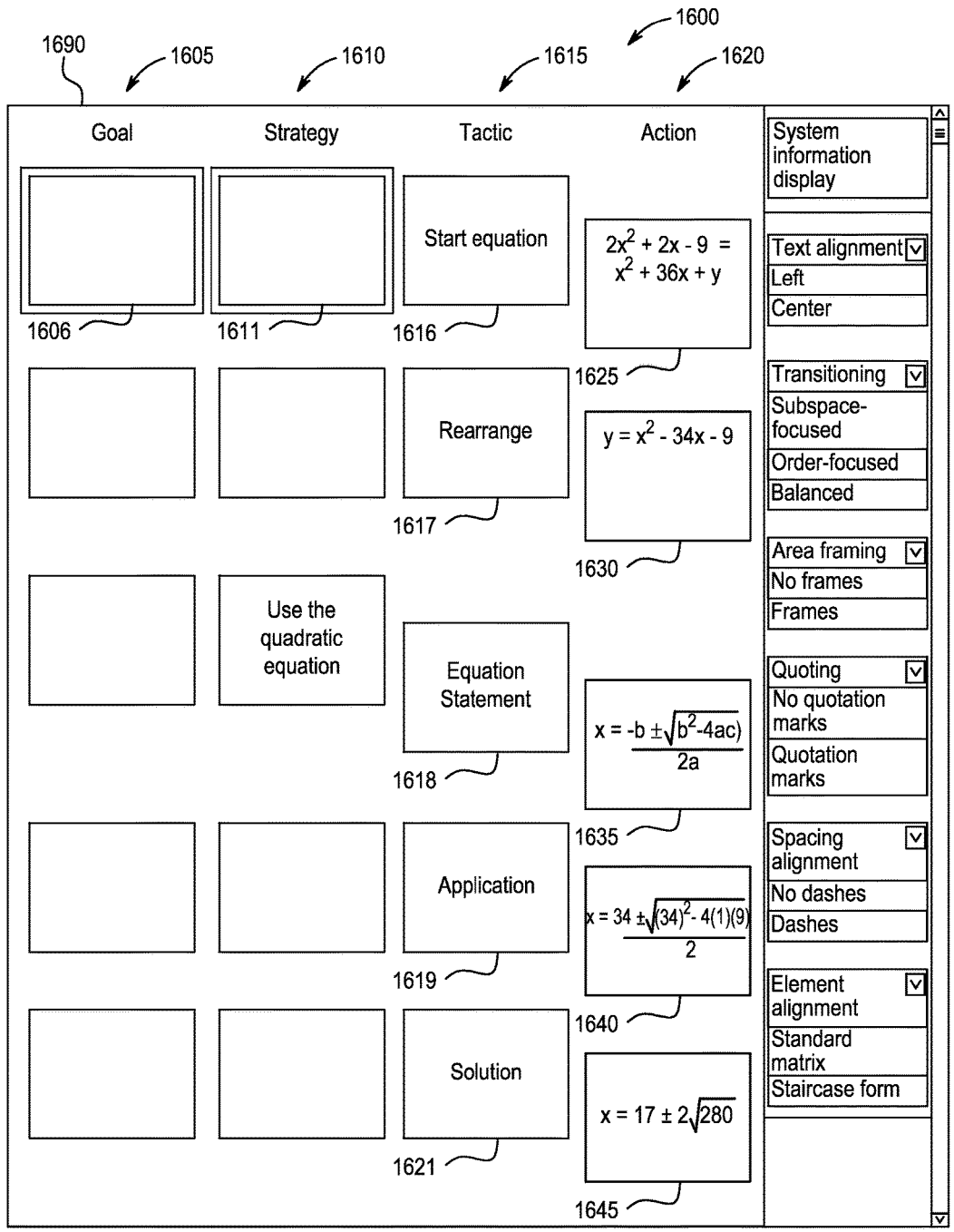
FIG. 16 is a diagram which illustrates another example computer interface.

In a further example, FIG. 16 illustrates generation of an answer key 1600 organized in a manner similar to lecture 1300 and displayed using an interface 1690 similar to interface 200 (FIGS. 2A, 2B). Columns 1605, 1610, 1615, and 1620 correspond to the goal, strategy, tactics, and actions for using the quadratic formula, as with lecture 1300 shown with respect to FIG. 13.

In this example, a teacher or other user may have access to a solution manual (which may be in electronic form) which contains example problems relating to the topic, e.g. applications of the quadratic equation. Here, an example problem might be to solve the equation shown in action 1625 by rearranging to the equation shown in action 1630 and using the quadratic equation shown in action 1635 applying it as the equation shown in action 1640 to obtain the result shown in action 1645.

The elements of this problem and solution may be entered manually into the answer key 1600 or may be automatically parsed into answer key 1600. This may be facilitated by a solution manual that is in electronic form, which may be formatted for such purpose. For example the starting equation shown in action 1625 may be imported manually or automatically into action 1625, which relates to tactic 1616, starting the equation. The rearranged equation shown in action 1630 may be imported into action 1630, which relates to tactic 1617, rearranging the equation. The quadratic equation shown in action 1635 may be imported into action 1635, which relates to the tactic 1618 of stating the equation. The equation shown in action 1640 may be imported into action 1640, which relates to the tactic 1619 of applying the equation. The equation shown in action 1645 may be imported into action 1645, which corresponds to the tactic 1621 of solving the equation. Elements of the answer key which are not directly or automatically generated in this example may be filled in later, such as goal 1606 and strategy 1611, for example.

Figure 17:
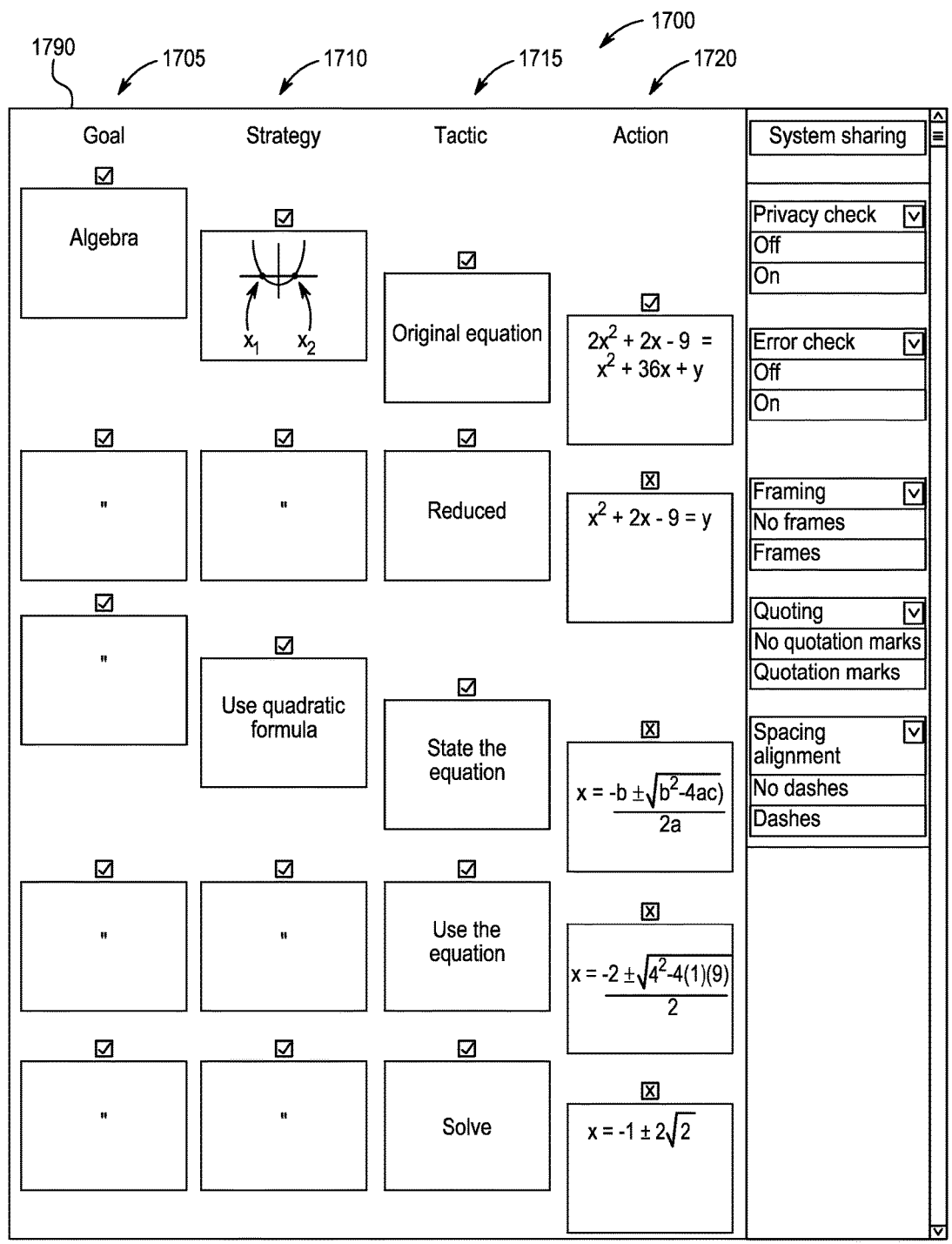
FIG. 17 is a diagram which illustrates another example computer interface.

In another example, FIG. 17 illustrates grading of a homework assignment 1700 organized in a manner similar to lecture 1300 and displayed using an interface 1790 similar to interface 200 (FIGS. 2A, 2B). Columns 1705, 1710, 1715, and 1720 correspond to the goal, strategy, tactics, and actions for using the quadratic formula, as with lecture 1300 shown with respect to FIG. 13.

By providing a homework format that is visually and structurally organized in a manner consistent with lecture 1300 and answer key 1600, for example, it may be possible to achieve better comprehension by the student and higher grading efficiency.

FIG. 18 is a block diagram illustrating an example system 1800 which may be used in various embodiments. System 1800 includes a client 1810 in communication with a server 1830, over a communications network 1850.

Client 1810 may include a computing device such as a personal computer, laptop, tablet, smartphone, or any other suitable device or combination of devices. Client 1810 may include a processor 1812, a transmit/receive element 1814, a keyboard 1816, a mouse 1818, a display/touchpad 1820, non-removable memory 1822, removable memory 1824, a power source 1826, other peripherals 1828. It will be appreciated that the client 1810 may include any sub-combination of the foregoing elements while remaining consistent with an embodiment. Client 1810 may include various software programs, such as web browsing software, stored on non-removable memory 1822 and/or removable memory 1824 which may be executed by processor 1812 and displayed to a user via display/touchpad 1820 such that the user may interact with the software using keyboard 1816 and/or mouse 1818 for example.

Server 1830 may include a computing device such as a server computer, cloud server, or any other suitable device or combination of devices. Server 1830 may include a processor 1832, a transmit/receive element 1814, a keyboard 1836, a mouse 1838, a display/touchpad 1840, non-removable memory 1842, removable memory 1844, a power source 1846, other peripherals 1848. It will be appreciated that the server 1830 may include any sub-combination of the foregoing elements while remaining consistent with an embodiment. Client 1810 may include various computer databases and/or programs, such as web server software, stored on non-removable memory 1822 and/or removable memory 1824. The web server software for example may be executed by processor 1832 and may provide access to server 1830 by a user of client 1810 over communications network 1850.

System 1800 may be used to implements various embodiments described herein. For example, sever 1830 may host all or a part of computer interface 200 (FIGS. 2A, 2B) or computer interface 300 (FIGS. 3A, 3B) possibly including any databases, for access by a user of computer interface 200 via client 1810. It is noted that other clients (not shown) may also allow the user or other users to access server 1830, and that client 1810 or other clients (not shown) may also access other servers (not shown) which may host all or portions of the functionality of various embodiments.

Communications network 1850 may include any suitable network or networks for communication between client 1810 and server 1830. For example, communications network 1850 may include the Internet, a local area network (LAN), a wireless network, or any suitable combination or sub-combination of such networks.

It is noted that some implementations may include a plurality of clients and/or servers. For example, system description 201 (FIG. 2A, 2B) may be stored across one or more databases and/or one or more servers including server 1830. In another example, one or more users may access system description 201 from one or more clients including client 1810. In a further example, system description 301 (FIGS. 3A, 3B) may be stored on server 1830 and a user may search other system descriptions or websites stored on server 1830 or on other servers using search button 302 or 309.

It is also noted that some implementations may include a single device, such as client 1810. For example, system description 201 may be stored on client device 1810, and the user may interact with the system description 201 without needing to access server 1830 or network 1850.

Referring to the foregoing, it will be appreciated that the information area-subsystem structure format may preserve information context easily and directly. The information area-subsystem structure format may have the advantage of decreasing the repetitive information and transition statements found in prose writing through the use of standardized, yet flexible, subsystem structure identification. Furthermore, the information area-subsystem structure format may allow the use of messages similar to that of web posting while having the depth of analysis found in traditional writing. As a result, complex information can be communicated using simple elements.

Furthermore, there may be a number of emergent advantages of the information area-subsystem structure format. It may be an accurate way of finding commonality between people, and finding unknown system information that the user is either aware of or not aware of. Also, it may provide a computer with the ability to learn context of information, to help with artificial Intelligence efforts. Lastly, for language translation and learning, the use of information context and relationships can be useful, essentially basing language more on mathematical patterns.

There may be other advantages when combined with other formatting or data. For example, using subsystem structures via ordered information, positioning effects may be used to further unbias information consumption and allow for more uncompromised reading flow. With geographical information, like city/state designations or IP addresses, users on the site may cooperate with one another more easily. Finally, a payment scheme may be provided that focuses on value delivered from the system information, presentation, and validity, especially with the use of results information.

There may also be a number of advantages to promoting positive psychological and sociological effects. In an era of increasing automation, there is and will be a greater need to train people quickly on different subject matter. When people lose their jobs; they may be better positioned to learn concepts and approaches on other subject matter. As a result, they may be able to take on new jobs or responsibilities. Furthermore, for people to successfully participate in democratic governments in an age of globalization, climate changes, and corporate relations; there may be a need for the population to be educated and well versed in these complex issues.

Although the aforementioned description contains a high amount of specificities, these should not be construed as limiting the scope of the embodiments but merely providing illustrations of some of several embodiments.

The system information creation, searching, and format conversions can be done in any combination or some may be omitted. A user may decide to do no searching when developing a system, or a user may choose to convert system information into the information area-subsystem structure format and not edit the system information afterwards.

The division of tasks between the server and client may be different. For example, all algorithms, except those for searching, may execute and store system information on a user's client computer. The remaining search algorithms may execute on other client computers that contain system information. Essentially, the algorithms may be executed on a mesh network of client computers without involving a server computer, or the user client computer could execute most algorithms and simply retrieve database tables and files from a server on an intermittent basis, based on the grouping search algorithm executing on a server.

The client-side scripts and server-side scripts may be written in different computer languages. The JavaScript and Ajax functions may be completed through other means, like a Java application. Server-side script languages may include Perl, PHP, Python, Ruby, and Java. For the databases, MySQL, Riak, Oracle, Neo4j, and Titan products may be used, for example.

The system information format of information area-subsystem structures may take different forms. For example, disks or pie diagrams may be used in the presentation of system information. The information areas may exist as sections within the disks. If an information area is within multiple subsystem structures, the disks may overlap to represent coupling or citations. Or the disks may stack on top of one another, as in the case of representing subspaces. Orders may be represented by designated sections of the disks. Or the subsystem structures may be represented by modified outline structure. Beyond what was previously described in the outline and information area-subsystem structure conversion, the subspaces may be represented by subscripts, each attached to the respective elements contained in the outline entries.

The key commands may be different in various implementations. For example, comparing the written English, Mandarin, and Persian languages, English is read left-right, up-down; Mandarin may be read up-down, left-right; and Persian is read right-left, up-down. As a result, Mandarin may have subspaces as columns and orders as rows. So pressing enter for example may go one order down instead of one subspace down, as in the case of Persian and English. In the case of information area selection through pressing the period button, the Mandarin functionality would cause information area one down to be selected, the Persian functionality would cause information area one to the left to be selected, all opposed to the English functionality of right information area selection. The key commands may also change based on user preferences, like the period press action. Finally, there may be automatic commands to go through the information areas in a certain sequence over a certain time period, like an auto-scroll.

The information areas may have actions for files. For example, pictures and videos may be created within an information area, like introducing a picture editor. For long text files, the information area may contain a preview of the file, and, when drilled down, the entire file can be reviewed.

The subsystem structures may have different numbers. There may be only one subsystem structure type, or N number, where N is a number greater than two. Having N subsystem structures may help in very complex system analysis where the data relationships are very different, but share some commonality.

There are a number of possible implementations concerning artificial intelligence. Principally, since the subspaces may represent the state of a user's mind at a given instant, a computer may use the subspaces to imitate the human mind. Using subspaces developed by many people, the computer may be able to surpass the strengths of individuals, similar to the demonstration of Watson on Jeopardy. However, improving on Watson, the computer will be better able to understand the deductive and inductive abilities of human beings directly. This insight allows the computer to better emulate human reasoning, appear more human, and even conduct research through the combination of various information areas and subsystem structures.

The results page and general data collection can take on various forms. For instance, the results page may have results and validation with pictures or video, similar to that of the information areas. Also, the data can be uploaded in real time by monitoring data inputs coming from other websites or sensors on mobile computers. For example, the system information can be dictated, taken from social media posts, and even inferred based on data entered and a comparison to system information of others. Also, there could exist a 'Prerequisite' column, to handle data about any preparations needed before taking action. The checkboxes could be moved to another location, or take another form, in order to make room for the Prerequisites.

The billing interface and functions can take on various forms. For example, installment, usage, or flat-fee billing can occur in replacement of or in conjunction to the existing billing. Furthermore, the billing may be enforced, as opposed to advised billing. Also, different calculation methods can be used. For example, through Ajax, the active user time can be calculated in specified time increments, instead of relying on login and logout times. Finally, indirect billing may be used, like advertisements of commercial solutions or of private individuals.

The interfaces in general can take on different forms based on the screen size. For example, most smart phones have a much smaller display size compared to the average laptop. As a result, the interface may be modified to show a single subsystem structure at a time. The user may scroll the display to show other subsystem structures. Furthermore, the staircase diagram may or may not be preferred by the user viewing the system information. If it is not preferred, the user may choose to see a regular row/column, or have subsystem structures referenced through a text indication. For example, showing an order at a time, an information area shows all subsystem structures it is a part of via numeral identifications.

The algorithms and methods can be used by various collections of people. For example, system sharing may be done within certain groups sharing some similarity, such as geographical location, company, system information, and performance characteristics. For performance characteristics, certain people may choose to author system information more than validate system information and vice versa. Furthermore, two or more people may edit some system descriptions and results at the same time. The multiple people may have different access levels, allowing different abilities. For example, system information editing, creating, assigning, executing, validating, and sharing, as well as admitting others to have access. Finally, the system information may be presented in the context of social networks, with user identifiable information connected to system information.

There are many forms the subsystem structures can be drawn in. For example, it could be drawn tree or web diagram form, so long as the diagrams have standardized meaning. Furthermore, the standardization can be indicated through different means. For example, indicated through textual descriptions, color differences, shape differences, or size differences.

Thus the scope of the embodiments should be determined by the appended claims, rather than the examples given.

It should be understood that many variations are possible based on the disclosure herein. Although features and elements are described above in particular combinations, each feature or element may be used alone without the other features and elements or in various combinations with or without other features and elements.

In addition, the methods or flow charts described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

It should be understood that many variations are possible based on the disclosure herein. Although features and elements are described above in particular combinations, each feature or element may be used alone without the other features and elements or in various combinations with or without other features and elements.

What is claimed is:

1. A method for displaying information using a computing device having an associated display, the method comprising:
    storing a plurality of nodes in a database on a non-transitory computer readable medium and accessible by a processor,
    wherein each node includes or references at least one data element, and wherein each node relates to an order and a subspace and is implicitly linked via the order and subspace to at least one other of the plurality of nodes such that the order and subspace imply a relationship between the data element and at least one other data element included in or referenced by the at least one other of the plurality of nodes;
    displaying a plurality of information areas on the display each information area showing stored information stored in one of the data elements, and each information area positioned on the display relative to the plurality of information areas based on the implied relationship, wherein the plurality of information areas are positioned on the display such that a final portion of stored information shown in a first information area is aligned with an initial portion of stored information shown in a next information area;
    selecting one of the plurality of information areas via a user interface;
    inputting input information into the selected information area via the user interface; and
    storing the input information from the selected information area to a data element corresponding to the selected information area.

2. The method of claim 1, further comprising:
    selecting one of the plurality of information areas; and
    searching for corresponding information in at least one different database which corresponds to the selected information area.

3. The method of claim 2, wherein the searching comprises identifying at least one node in the at least one different database having a link corresponding to a link of a node corresponding to the selected information area.

4. The method of claim 2, wherein the search is restricted to a subset of the at least one different database based upon a link of a node corresponding to the selected information area.

5. The method of claim 2, wherein the search is restricted to nodes within the at least one different database having a link to at least one other node within the at least one different database corresponding to a link of a node corresponding to the selected information area.

6. The method of claim 2, wherein the selected information area occupies a position within the plurality of information areas and the search is restricted to information within the at least one different database occupying a corresponding position.

7. The method of claim 2, wherein the selected information area corresponds to a node occupying a position within the database and the search is restricted to information associated with nodes within the at least one different database that occupy a corresponding position.

8. The method of claim 2, wherein the selected information area is selected by a user via an input interface.

9. The method of claim 2, wherein the selected information area is automatically selected based upon information within the information area.

10. The method of claim 2, wherein the selected information area is automatically selected based upon their being no information within the information area.

11. The method of claim 2, further comprising, on a condition that corresponding information is discovered, populating the selected information area with at least a part of the discovered corresponding information.

12. The method of claim 2, further comprising, on a condition that corresponding information is discovered, displaying a plurality of discovered corresponding information, inputting a selection of one of the plurality of discovered corresponding information, and populating the selected information area with the selected discovered corresponding information.

13. The method of claim 2, further comprising, on a condition that corresponding information is discovered, comparing information reflected by the selected information area with the discovered corresponding information.

14. The method of claim 13, further comprising calculating a score based upon the comparison.

15. The method of claim 1, further comprising sharing the database for comparison with users of other databases.

16. The method of claim 15, further comprising sharing a subset of the plurality of information areas and/or nodes for comparison and denying access to a second subset of the plurality of information areas and/or nodes, wherein the information areas and/or nodes are assigned to the second subset based upon information within the information areas.

17. The method of claim 1, wherein each node references at least one data element using a pointer.

18. The method of claim 1, wherein the plurality of information areas are positioned on the display such that a last line of text information shown in the first information area is horizontally aligned with a first line of text information shown in the next information area, in which the lines of text are horizontal.

19. The method of claim 1, wherein the plurality of information areas are positioned on the display such that a last line of text information shown in the first information area is vertically aligned with a first line of text information shown in the next information area, in which the lines of text are vertical.

20. A method for displaying information using a computing device having an associated display, the method comprising:

storing a plurality of nodes in a database on a non-transitory computer readable medium and accessible by a processor, wherein each node includes or references at least one data element, and wherein each node relates to an order and a subspace and is implicitly linked via the order and subspace to at least one other of the plurality of nodes such that the order and subspace imply a relationship between the data element and at least one other data element included in or referenced by the at least one other of the plurality of nodes;

displaying a plurality of information areas on the display each information area showing stored information stored in one of the data elements, and each information area positioned on the display relative to the plurality of information areas based on the implied relationship, wherein the plurality of information areas are positioned on the display such that a final portion of stored information shown in a first information area is aligned with an initial portion of stored information shown in a next information area;

selecting an input source; and inputting information into the plurality of information areas from the input source.

21. The method of claim 20, further comprising parsing the input source and inputting information from the input source into particular information areas of the plurality of information areas based upon a format of the input source, a detected data type, a flag, a heading, and a relationship among data within the input source.

22. A computing device having an associated display for displaying information comprising:

a processor in communication with a non-transitory computer readable medium;

an input interface configured to create a plurality of nodes in a database stored on the non-transitory computer readable medium, wherein each node includes or references at least one data element, and wherein each node relates to an order and a subspace and is implicitly linked via the order and subspace to at least one other of the plurality of nodes such that the order and subspace imply a relationship between the data element and at least one other data element included in or referenced by the at least one other of the plurality of nodes;

a display configured to display a plurality of information areas each information area showing stored information stored in one of the data elements, and each information area positioned relative to the plurality of information areas based on the implied relationship, wherein the plurality of information areas are positioned on the display such that a final portion of stored information shown in a first information area is aligned with an initial portion of stored information shown in a next information area;

an input interface configured:
  to select one of the plurality of information areas,
  to input information into the selected information area, and
  to store the input information from the selected information area to a data element of the at least one data element which corresponds to the selected information area.

* * * * *